US010216919B2

(12) United States Patent
Li et al.

(10) Patent No.: US 10,216,919 B2
(45) Date of Patent: Feb. 26, 2019

(54) ACCESS BLOCKING FOR DATA LOSS PREVENTION IN COLLABORATIVE ENVIRONMENTS

(71) Applicant: MICROSOFT TECHNOLOGY LICENSING, LLC, Redmond, WA (US)

(72) Inventors: Yu Li, Bellevue, WA (US); Willard Bruce Jones, Redmond, WA (US); Ryan Wilhelm, Kirkland, WA (US); Richard Wesley Holley, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/408,410

(22) Filed: Jan. 17, 2017

(65) Prior Publication Data

US 2017/0126697 A1   May 4, 2017

Related U.S. Application Data

(63) Continuation of application No. 14/630,435, filed on Feb. 24, 2015, now Pat. No. 9,697,349.

(Continued)

(51) Int. Cl.
*G06F 21/44* (2013.01)
*G06F 21/31* (2013.01)
(Continued)

(52) U.S. Cl.
CPC ............ *G06F 21/44* (2013.01); *G06F 17/211* (2013.01); *G06F 21/31* (2013.01);
(Continued)

(58) Field of Classification Search
None
See application file for complete search history.

(56) References Cited

U.S. PATENT DOCUMENTS 7,376,824 B2    5/2008   Bowers et al.
7,627,507 B1   12/2009   Drakeley et al.
(Continued)

FOREIGN PATENT DOCUMENTS

| CN | 102984199 A | 3/2013 |
| GB | 2466367 A | 6/2010 |
| WO | 2009055083 A1 | 4/2009 |

OTHER PUBLICATIONS

"Non-Final office action issued in U.S. Appl. No. 14/630,435", dated May 6, 2016, 18 Pages.
(Continued)

*Primary Examiner* — Trang T Doan
(74) *Attorney, Agent, or Firm* — Michael Best & Friedrich LLP

(57) ABSTRACT

Data loss prevention (DLP) systems may be implemented in conjunction with collaborative services that may be integrated with or work in coordination with productivity services. Administrators may be enabled to configure DLP policies in the collaborative service to mitigate their organization's information disclosure risks, along with the detection and remediation of sensitive information. Access blocking may be one feature of the DLP system, where provision of access blocking may include determining if a detected action associated with content processed by the collaborative service matches access blocking criteria defined by DLP policy rules. In response to the determination that the action matches at least one access blocking criterion defined by the DLP policy rules, a block access tag associated with the content may be activated, previously defined permissions associated with the content may be ignored or altered, and access to the content may be restricted to a number of predefined users.

20 Claims, 14 Drawing Sheets

Related U.S. Application Data

(60) Provisional application No. 62/068,728, filed on Oct. 26, 2014, provisional application No. 62/068,744, filed on Oct. 26, 2014.

(51) Int. Cl.
*G06F 17/21* (2006.01)
*G06F 21/62* (2013.01)
*G06Q 10/10* (2012.01)
*H04L 29/06* (2006.01)
*H04L 29/08* (2006.01)

(52) U.S. Cl.
CPC ....... *G06F 21/6209* (2013.01); *G06Q 10/103* (2013.01); *H04L 63/105* (2013.01); *H04L 67/10* (2013.01)

(56) References Cited

U.S. PATENT DOCUMENTS

| | | |
|---|---|---|
| 7,769,731 B2 | 8/2010 | O'Brien |
| 7,840,690 B2 | 11/2010 | Thayer et al. |
| 7,917,938 B2 | 3/2011 | Jacobson |
| 7,996,374 B1 * | 8/2011 | Jones .................... G06Q 10/10 707/694 |
| 7,996,385 B2 | 8/2011 | Rowney et al. |
| 8,060,596 B1 | 11/2011 | Wootton et al. |
| 8,111,154 B1 | 2/2012 | Puri et al. |
| 8,141,159 B2 | 3/2012 | Peled et al. |
| 8,225,371 B2 | 7/2012 | Jones et al. |
| 8,296,784 B1 | 10/2012 | Brown et al. |
| 8,316,049 B2 | 11/2012 | Saito |
| 8,356,357 B1 | 1/2013 | Barile et al. |
| 8,365,243 B1 * | 1/2013 | Lu .......................... G06F 21/10 380/287 |
| 8,499,152 B1 | 7/2013 | Chen et al. |
| 8,533,841 B2 | 9/2013 | Kulkarni et al. |
| 8,543,606 B2 | 9/2013 | Pulfer et al. |
| 8,544,060 B1 | 9/2013 | Khetawat |
| 8,656,288 B2 | 2/2014 | Roger et al. |
| 8,656,455 B1 | 2/2014 | Bailey et al. |
| 8,671,080 B1 | 3/2014 | Upadhyay et al. |
| 8,677,448 B1 | 3/2014 | Kauffman et al. |
| 8,726,405 B1 * | 5/2014 | Bailey ................. G06F 21/6218 726/26 |
| 8,789,147 B1 | 7/2014 | Agarwal et al. |
| 8,800,031 B2 | 8/2014 | Cecil et al. |
| 8,832,780 B1 | 9/2014 | Sarin et al. |
| 8,843,734 B2 | 9/2014 | Lim |
| 8,849,857 B2 | 9/2014 | Bray et al. |
| 9,195,808 B1 | 11/2015 | Nestler |
| 9,401,900 B2 | 7/2016 | LeVasseur et al. |
| 9,697,349 B2 | 7/2017 | Li et al. |
| 9,754,098 B2 | 9/2017 | Li et al. |
| 2006/0075228 A1 | 4/2006 | Black et al. |
| 2006/0120526 A1 | 6/2006 | Boucher et al. |
| 2006/0200803 A1 | 9/2006 | Neumann et al. |
| 2006/0265760 A1 | 11/2006 | Daemke et al. |
| 2008/0107261 A1 | 5/2008 | Kistner |
| 2008/0120688 A1 | 5/2008 | Qiu et al. |
| 2008/0209336 A1 | 8/2008 | Brown et al. |
| 2008/0301760 A1 * | 12/2008 | Lim ........................ H04L 63/20 726/1 |
| 2009/0070881 A1 | 3/2009 | Yellepeddy et al. |
| 2009/0164878 A1 | 6/2009 | Cottrille |
| 2010/0071024 A1 | 3/2010 | Eyada |
| 2010/0082687 A1 | 4/2010 | Saito |
| 2010/0162347 A1 * | 6/2010 | Barile .................... G06F 21/552 726/1 |
| 2010/0251369 A1 * | 9/2010 | Grant .................... G06F 21/554 726/23 |
| 2010/0306850 A1 | 12/2010 | Barile et al. |
| 2011/0167474 A1 | 7/2011 | Sinha et al. |
| 2012/0017261 A1 | 1/2012 | Lim |
| 2012/0159565 A1 | 6/2012 | Bray et al. |
| 2012/0304316 A1 | 11/2012 | Ramani et al. |
| 2013/0067568 A1 | 3/2013 | Obasanjo et al. |
| 2013/0086699 A1 | 4/2013 | Polis et al. |
| 2013/0104190 A1 * | 4/2013 | Simske ................. G06Q 10/10 726/1 |
| 2013/0110748 A1 | 5/2013 | Talati et al. |
| 2013/0198618 A1 * | 8/2013 | Tanzer .................. G06F 21/604 715/255 |
| 2013/0305322 A1 | 11/2013 | Raleigh et al. |
| 2013/0340030 A1 | 12/2013 | Riley et al. |
| 2014/0006347 A1 | 1/2014 | Qureshi et al. |
| 2014/0007181 A1 | 1/2014 | Sarin et al. |
| 2014/0020044 A1 * | 1/2014 | Ayres ..................... H04L 51/12 726/1 |
| 2014/0020045 A1 | 1/2014 | Kabat et al. |
| 2014/0026181 A1 | 1/2014 | Kiang et al. |
| 2014/0026182 A1 | 1/2014 | Pearl et al. |
| 2014/0047503 A1 | 2/2014 | Marshall et al. |
| 2014/0115710 A1 | 4/2014 | Hughes et al. |
| 2014/0123228 A1 | 5/2014 | Brill et al. |
| 2014/0194094 A1 | 7/2014 | Ahuja et al. |
| 2014/0196105 A1 | 7/2014 | Hung |
| 2014/0259190 A1 * | 9/2014 | Kiang .................. G06F 21/6218 726/30 |
| 2014/0323213 A1 | 10/2014 | Wakeford et al. |
| 2015/0082379 A1 | 3/2015 | Hou et al. |
| 2015/0127607 A1 * | 5/2015 | Savage ............. G06F 17/30194 707/610 |
| 2015/0222665 A1 | 8/2015 | Eberlein et al. |
| 2016/0055343 A1 | 2/2016 | Coard |
| 2016/0070905 A1 | 3/2016 | Antoun et al. |
| 2016/0072831 A1 | 3/2016 | Rieke |
| 2016/0080293 A1 | 3/2016 | Singh et al. |
| 2016/0088020 A1 | 3/2016 | Chan et al. |
| 2016/0117495 A1 | 4/2016 | Li et al. |
| 2016/0117517 A1 | 4/2016 | Li et al. |
| 2016/0359860 A1 | 12/2016 | Dasari et al. |
| 2017/0126697 A1 | 5/2017 | Li et al. |

OTHER PUBLICATIONS

"Notice of Allowance Issued in U.S. Appl. No. 14/630,435", dated Nov. 10, 2016, 17 Pages.

"Notice of Allowance Issued in U.S. Appl. No. 14/630,435", dated Feb. 2, 2017, 4 Pages.

Koutsourelis, et al., "Designing and Developing a Free Data Loss Prevention system", In Proceedings of the 18th Panhellenic Conference on Informatics, Oct. 2, 2014, 5 Pages.

Mogull, Rich, "Understanding and Selecting a Data Loss Prevention Solution", Retrieved from «https://securosis.com/assets/library/reports/Understanding_and_Selecting_DLP_V2_.Final_.pdf», Oct. 21, 2010, 56 Pages.

Tahboub, et al., "Data Leakage/Loss Prevention Systems (DLP)", In Proceedings of World Congress on Computer Applications and Information Systems, Jan. 17, 2014, 6 Pages.

"Second Written Opinion Issued in PCT Application No. PCT/US2015/055619", dated Nov. 8, 2016,6 Pages.

"International Search Report & Written Opinion Issued in PCT Application No. PCT/US2015/055619", dated Jan. 5, 2016, 10 Pages.

"International Preliminary Report on Patentability Issued in PCT Application No. PCT/US2015/055619," dated Mar. 29, 2017, 7 Pages.

"What is the OpenID account chooser?", Retrieved from: https://www.accountchooser.com/learnmore.html, Jul. 5, 2014, 2 Pages.

"Final Office Action Issued in U.S. Appl. No. 14/485,615", dated Mar. 9, 2017, 15 Pages.

"Non Final Office Action Issued in U.S. Appl. No. 14/485,615", dated Nov. 10, 2016, 13 Pages.

"Final Office Action Issued in U.S. Appl. No. 14/633,097", dated Sep. 19, 2016, 22 Pages.

"Non Final Office Action Issued in U.S. Appl. No. 14/633,097", dated Apr. 21, 2016, 19 Pages.

(56) References Cited

OTHER PUBLICATIONS

"Non Final Office Action Issued in U.S. Appl. No. 14/633,097", dated Feb. 7, 2017, 21 Pages.
"Office Action Issued in European Patent Application No. 15775028.2", dated Jan. 31, 2018, 6 Pages.
Google, Support, "Sign in Faster and Easier", Retrieved from: https://support.google.com/accounts/?hl=en#topic=3382296, Jul. 5, 2014, 3 Pages.
"International Preliminary Report on Patentability Issued in PCT Application No. PCT/US2015/049537", dated Jan. 13, 2017, 8 Pages.
"International Search Report & Written Opinion Issued in PCT Application No. PCT/US2015/049537", dated Nov. 12, 2015, 12 Pages.
"Second Written Opinion Issued in PCT Application No. PCT/US2015/049537", dated Sep. 14, 2016, 10 Pages.
"International Preliminary Report On Patentability Issued in PCT Application No. PCT/US2015/057269", dated Apr. 12, 2017, 7 Pages.
"International Search Report & Written Opinion Received for PCT Application No. PCT/US2015/057269", dated Dec. 21, 2015, 10 Pages.
"Second Written Opinion Issued in PCT Application No. PCT/US2015/057269", dated Oct. 11, 2016, 6 Pages.
Shulttz, Greg, "Force Windows 8 to Show All User Accounts on the Sign on Screen", Retrieved from: https://www.techrepublic.com/blog/windows-and-office/force-windows-8-to-show-all-user-accounts-on-the-sign-on-screen/, Jun. 4, 2013, 17 Pages.
"Summons to Attend Oral Proceedings Issued in European Patent Application No. 15775028.2", dated Nov. 13, 2018, 8 Pages.
"First Office Action and Search Report Issued in Chinese Patent Application No. 201580048911.4", dated Oct. 9, 2018, 10 Pages.

\* cited by examiner

FIG. 6B

POLICY TIPS: DOC APPEARS TO CONTAIN SENSITIVE INFORMATION. CLICK HERE FOR MORE INFORMATION

| DATE | PERSON |
|---|---|
| 8/2/14 | 1 |
| 8/3/14 | 2 |
| 8/3/14 | 3 |
| 9/6/14 | 4 |
| 9/7/14 | 5 |
| 9/8/14 | 6 |
| 9/8/14 | 7 |
| 9/9/14 | 8 |

ACCESS BLOCKING FOR DATA LOSS
PREVENTION IN COLLABORATIVE
ENVIRONMENTS

CROSS-REFERENCE TO RELATED APPLICATIONS

This Application is a continuation application under 35 U.S.C. § 120 of U.S. patent application Ser. No. 14/630,435 filed on Feb. 24, 2015, which claims benefit under 35 U.S.C. § 119(e) of U.S. Provisional Application Ser. No 62/068,728 filed on Oct. 26, 2014, and U.S. Provisional Application Ser. No. 62/068,744 filed on Oct. 26, 2014. The U.S. Patent Application and Provisional Applications are herein incorporated by reference in their entireties.

BACKGROUND

Data loss prevention (DLP) is a feature set that helps enable organizations to identify, monitor, and protect sensitive information through deep content analysis. For example, DLP may be implemented in conjunction with collaborative services that may be integrated with or work in coordination with productivity services providing word processing, spreadsheet, presentation, communication, note taking, and comparable functionalities. In recent years, compliance with regulatory requirements has become a hot topic for many organizations and in turn it has also become a key business objective within productivity services. This drive for compliance makes DLP an important feature set customers demand.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to providing access blocking as part of data loss prevention (DLP) within a collaborative service environment. An action associated with content processed by the collaborative service may be detected and a determination may be made if the action matches access blocking criteria defined by one or more DLP policy rules. In response in the determination that the action matches at least one access blocking criterion defined by the DLP policy rules, a block access tag associated with the content may be activated, previously defined permissions associated with the content may be ignored, and access to the content may be restricted to a number of predefined users.

These and other features and advantages will be apparent from a reading of the following detailed description and a review of the associated drawings. It is to be understood that both the foregoing general description and the following detailed description are explanatory and do not restrict aspects as claimed.

BRIEF DESCRIPTION OF THE DRAWINGS

FIGS. 6A-C illustrate example user experiences associated with a user reclassification of an access block following removal of content;

DETAILED DESCRIPTION

Figure 1:
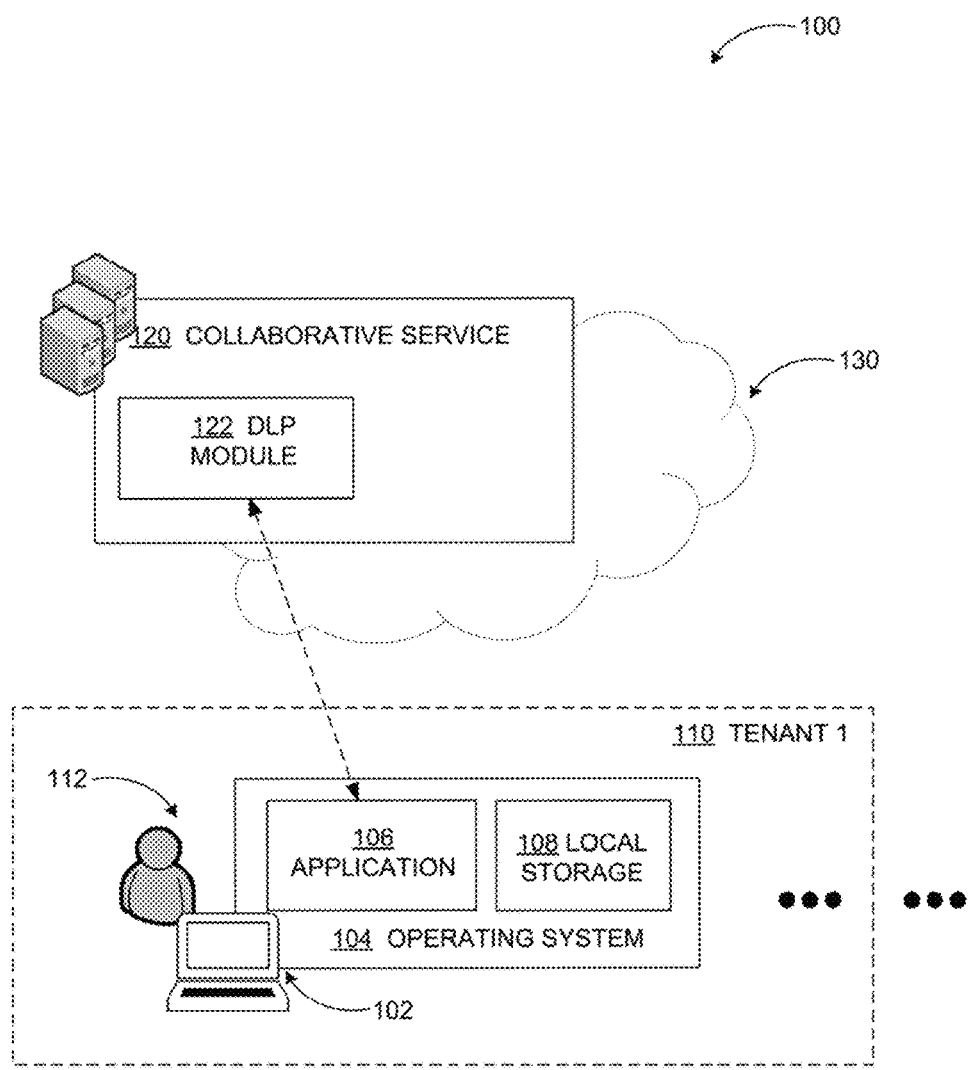
FIG. 1 includes an example network environment where access blocking may be provided server-side as part of data loss prevention (DLP) within a collaborative service environment.

As briefly described above, data loss prevention (DLP) systems may be implemented in conjunction with collaborative services that may be integrated with or work in coordination with productivity services providing word processing, spreadsheet, presentation, communication, note taking, and comparable functionalities, for example. DLP services may be implemented in data at rest (DAR) or data in transit (DIT) scenarios, and allow administrators to configure DLP policies in the collaborative service to help mitigate their organization's information disclosure risks, along with the detection and remediation of sensitive information. Encryption, content classification, policy management, user notification, incident report generation, and access blocking may be some of the features of a comprehensive DLP system implemented in conjunction with a collaborative service. Provision of access blocking, for example, may include determining if a detected action associated with content processed by the collaborative service matches access blocking criteria defined by one or more DLP policy rules. In response to the determination that the action matches at least one access blocking criterion defined by the one or more DLP policy rules, a block access tag associated with the content may be activated, previously defined permissions associated with the content may be ignored or additional constraints to the permissions may be applied, and access to the content may be restricted to a number of predefined users.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing, devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for providing access blocking as pan of DLP implementation in collaborative service environments. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed, as a server on the network. More detail on these technologies and example operations is provided below.

FIG. 1 includes an example network environment where access blocking may be provided server-side as part of DLP within a collaborative service environment.

In one example configuration, as illustrated in diagram 100, one or more servers may provide a collaborative service 120 to a plurality of clients or tenants. Each tenant may provide access to a number of applications executed within the infrastructure provided by the collaborative service 120 to their users. The applications may include any application such as word processing applications, spreadsheet applications, presentations applications, communication applications, imaging applications, audio/video processing applications, graphic processing applications, and comparable ones.

As illustrated in FIG. 1, the collaborative service environment may be a hosted environment. However, the collaborative service environment is not limited to this specific example. Alternatively, the collaborative service environment may include one or more applications or similar environments, through which users may be able to create, edit, review, and/or share content. The collaborative service environment may also be any type of environment where the users can exchange content, among other examples.

On the user side, a user 112 may execute a thin (e.g., a web browser) or a thick (e.g., a locally installed client application) application 106 within an operating system 104 of their computing device 102 and access the services provided by the collaborative service 120 and its associated applications over one or more networks such as network 130. The computing device 102 may include a desktop computer, a laptop computer, a tablet computer, a vehicle mount computer, a smart phone, or a wearable computing device, among other similar devices. User 112 may be an example user under a tenant 110. As discussed above, any number of users within the infrastructure of any tenant may access the services of the collaborative service 120. User 112 may store content or files associated with the one or more applications provided under the umbrella of the collaborative service 120 locally at local storage 108 or remotely at data stores managed by the collaborative service 120 or by third party services.

The collaborative service 120 may include, among other things, a DLP module 122 configured to manage and enforce DLP policies. For example, content processed by the collaborative service 120 may be evaluated against one or more DLP policy rules created by a tenant administrator in response to the content being opened, saved, deleted, edited, copied, moved, uploaded, downloaded, printed, and/or shared through one of the applications and/or at an expiration of a predefined time interval. In some embodiments, an action associated with the content processed by the collaborative service may be detected and a determination may be made if the action matches access blocking criteria defined by the DLP policy rules. The action may include insertion of sensitive information into the content, such as credit card numbers and Social Security numbers, for example. In some embodiments, an entirety of the content may include sensitive information, such as a patent document or a design specification. In other embodiments, a portion of the content may include sensitive data, such as an expenditure report that includes a credit card number.

In response to the determination that the action matches at least one access blocking criterion defined by the policy rules, a block access tag associated with the content may be activated, previously defined permissions associated with the content may be ignored and/or additional constraints to the permissions may be applied, and access to the content may be restricted to a number of predefined users. The predefined users may include an owner (such as the user 112), an administrator, and a last modifier of the content, and the restricted access may include read, edit, and share permissions, for example. The predefined users may also include one or more users that belong to a role defined for managing content with restricted access. In some examples, the predefined users that may have access to restricted content may change as the predefined users' memberships in security groups change. For example, the one or more users may gain or lose status as an administrator, or gain or lose membership in some other role that grants access to restricted content. In other embodiments, access to the content may be restricted to one or more users based on the matched access blocking criteria defined by DLP policy rules. For example, DLP policy rules may define that only internal employees organization may view confidential documents. If an internal employee attempts to share a confidential confidential document with other internal employees along with an external employee to the organization, access blocking criteria associated with the confidential document and the attempted share with the external employee may be matched. Accordingly, access to the shared confidential document may be restricted to the other internal employees, while the access tea the shared confidential document would be blocked to the external employee.

In some embodiments, a notification may be provided to the user 112 through a user experience of the collaborative service 120 to indicate the restricted access to the content. The notification may include a link to a DLP policy document that includes the DLP policy rules, a link to a location of the content, and various control elements associated with one or more actions for the user 112 to implement in order to deactivate the block access tag associated with the content, reinstate previously defined permissions associated with the content, and/or revoke the restricted access to the content. The user 112 may be enabled to interact with the user experience of the collaborative service 120 through one or more of touch input, gesture input, voice command, eye tracking, gyroscopic input, pen input, mouse input, and/or keyboard input. For example, the user 112 may be enabled to override the restricted access to the content, report a false positive associated with information corresponding to the at least one access blocking criterion, and/or request a policy cheek or a reclassification in response to the notification to prompt another evaluation of the content with the DLP policy rules.

Additionally, the user 112 may be enabled to remove the information corresponding to the at least one access blocking criterion from the content. For example, the user 112 may remove the sensitive information from the content. Furthermore, the user 112 may be enabled to remove offending users with access to the content. In one example, if the user 112 is sharing restricted content with a multitude of users that include offending users, the user may remove the offending users from a list to share. In another example, if the user 112 has saved the restricted content to a location where offending users may have access to the restricted content, the user 112 may save the restricted content to a new location such that the offending users no longer have access.

In some embodiments, the match, the restricted access to the content, an override, and a reported false positive may be recorded within a log or report associated with the collaborative service. Furthermore, the block access tag associated with the content may be persisted to an index of the collaborative service such that when external users without access to the content are searching the collaborative service, the access to the content remains restricted. For example, the content may not be displayed in search results for a query issued by one or more of the external users without access to the content. Additionally, an entry may be generated within an audit log to indicate when the content is restricted, when the content is unrestricted, and if the restriction associated with the content is overridden (with additional business justification) or information associated with the at least one access blocking criterion is reported as a false positive by the predefined users, for auditing and reporting purposes. The entry within the audit log may also indicate which DLP policy and corresponding DLP policy rules were violated to invoke the restricted access to the content.

In other embodiments, the content to which access is restricted may include various versions, where the versions may follow a similar pattern to in-place hold. For example, the versions may be temporarily moved, to a secure archive location within a site and may be held there for a predefined number of days, where the archive location may only be accessible by the site collection administrator, or another user that belongs to a role defined for the purpose of managing such content. However, the owner, an administrator, such as the site collection administrator, and/or last modifier of the content, among others, may be notified when versions have been archived. Archiving of versions may occur when one or more of the predefined users remove the information corresponding to access blocking criteria from the content and/or remove offending users with access to the content. All other actions, such as a user override of the restricted access to the content and/or report of false positive associated with the information corresponding to access blocking criteria, may not be impacted by versioning since the information corresponding to the at least one access blocking criterion (e.g., sensitive information) remains within the document.

As previously discussed, DLP is a feature set that enables organizations to identify, monitor, and protect sensitive information through deep content analysis, where DLP may be implemented in conjunction with collaborative services. Provision of access blocking as part of DLP may help improve process security by restricting access to content that includes sensitive information, and reduce network bandwidth through creation of automated tasks to detect sensitive content and block access to the content. Additionally, enabling the user 112 to interact with the user experience of the collaborative service 130 to perform one or more actions associated with the blocked access may improve user efficiency, as well as increase user interaction performance. Furthermore, enabling the user 112 to view the links provided with the notification through the user experience of the collaborative service 120 may educate the user 112 about an organization, such as their place of employment, DLP policies associated with the organization, and how user actions may affect the organization.

Figure 2:
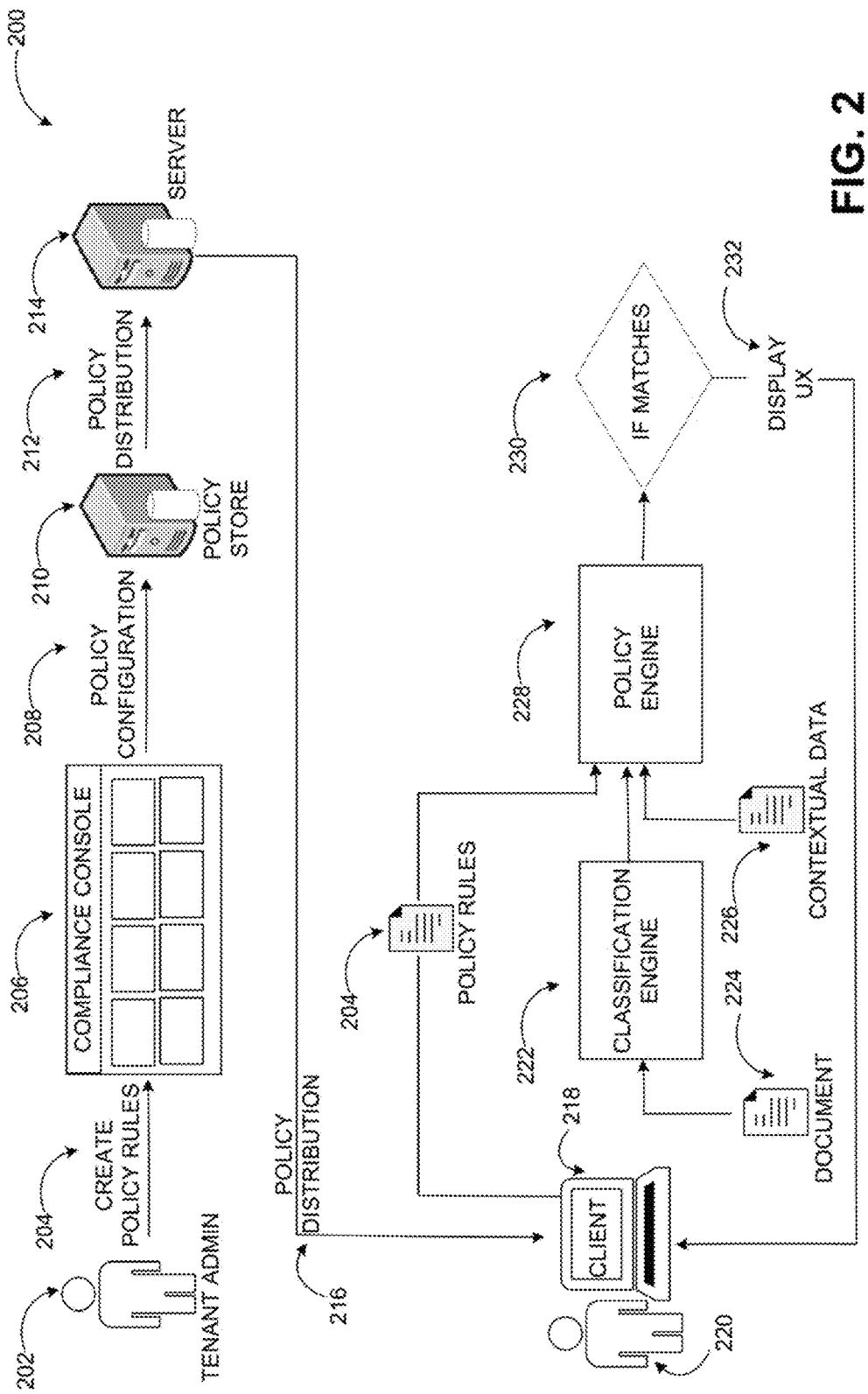
FIG. 2 illustrates another example network environment where access blocking may be provided client-side as part of DLP within a collaborative service environment.

FIG. 2 illustrates another example network environment where access blocking may be provided client-side as part of DLP within a collaborative service environment.

As previously discussed, a tenant may provide access to a number of applications executed within the infrastructure provided by a collaborative service to their users. The applications may include any application such as word processing applications, spreadsheet applications, presentations applications, communication applications, imaging applications, audio video processing applications, graphic processing applications, and comparable ones.

In an example scenario, as illustrated in diagram 200, a tenant administrator 202, may create one or more DLP policy rules 204 through a policy management user interface associated with a compliance console 206. The DLP policy rules 204, for example, may block access to any documents that have been shared externally when the document contains credit card information. A DLP policy may be configured 208 from the DLP policy rules 204 and stored at a policy store 210 for subsequent distribution 212 to one or more servers 214 associated with the tenant. The server(s) 214 associated with the tenant may then further distribute the DLP policy 216 to a client 218 associated with a user 220 under the tenant.

The client 218 may include a classification engine 222 and a policy engine 228 configured to evaluate a document 224 against the DLP policy rules 204 created by the tenant administrator 202 in response to the document 224 being opened, saved, deleted, edited, copied, moved, uploaded, downloaded, printed, and/or shared by a user 220 through one of the applications and/or upon an expiration of a pre-defined time interval. For example, upon receipt of the DLP policy from the server(s) 214 associated with the tenant, the client 218 may be configured to transmit the DLP policy rules 204 to the policy engine 228. Concurrently, the classification engine 222 may be configured to analyze the document 224 to detect an action associated with the document 224, such as insertion of sensitive information within the document. The detected action may be transmitted to the policy engine 228, along with contextual data 226 associated with the document 224, to determine if the action matches access blocking criteria defined by the DLP) policy rules 204. In response to a determination that the action matches 230, a block access tag associated with the document 224 may be activated, previously defined permissions associated with the document 224 may be ignored or additional constraints to the permissions may be applied, and access to the document 224 may be restricted to a number of predefined users. In other embodiments, access to the document 224 may be restricted to one or more users based on the matched access blocking criteria defined by DLP policy rules. Furthermore, a user experience comprising a notification may be displayed 232 to the user 220 through the client 218 indicating the restricted access to the document 224. Once the access the document 224 has been blocked, only an author/user who uploaded the document 224, a modifier of the document 224, and an administrator, among other predefined users identified, may continue to have access to the document 224.

In some examples, the notification may include a link to as DLP policy document that includes the DLP policy rules 204, a link, to a location of the document 224, and various control elements associated with one or more actions for the user 220 to implement in order to deactivate the block access tag associated with the document 224, reinstate previously defined permissions associated with the document 224, and revoke the restricted access to the document 224. The user 220 may be enabled to interact with the user experience through one or more of touch input, gesture input, voice command, eye tracking, gyroscopic input, pen input, mouse input, and/or keyboard input.

For example, the user 220 may work on documents, such as document 224, with credit card information daily. Currently, the user 220 may be collaborating on the document 224 with one or more members of a team, who also have access to credit card information. The user 220 may save the document 224 such that it is uploaded to a collaborative service site to share with the team, not realizing external users may also have access to the location. In response to the save, the document 224 may be evaluated against the DLP policy rules 204 created by the tenant administrator 202. The user 220 may receive a notification through a user experience associated with the collaborative service indicating that the upload of the document 224 has been blocked because it may contain credit card information that matched an access blocking criterion of the DLP policy rules 204, and furthermore, the location to which the document 224 was uploaded is accessible by external users (e.g., offending users of the policy). According to embodiments, the user experience associated with the collaborative service may be synchronous or asynchronous. In one example, the user experience associated with the collaborative service may be synchronous, and thus may display the notification in real-time to the user 220 as the upload of the document 224 is being blocked. Alternatively, the user experience associated with the collaborative service may be asynchronous, and thus may only be updated periodically or upon demand causing a potential delay in the display of the notification to the user 220 indicating that the upload, of the document 224 has been blocked. For example, to prevent reducing an amount of bandwidth available to the user 220, the user experience may be updated during a quiet period associated with low data transmissions, such as in the middle of the night.

In response, the user 220 may be enabled to actuate a link within the notification, which may redirect the user 220 to the location of the document 224 in the collaborative service. A textual scheme, a graphical scheme, an audio scheme, an animation scheme, a coloring scheme, a highlighting scheme, and a shading scheme may be employed in the collaborative service user experience to indicate the document 224 has restricted access. For example, an icon may be displayed adjacent to and/or on the document 224 in the collaborative service, to provide a visual indication that the document 224 is now blocked. In other examples, the user 220 may be enabled to actuate a link within the notification, which may redirect the user 220 to as DLP policy document that includes the DLP policy rules 204 and one or more actions the user 220 may implement to deactivate the block access tag associated with the document 224, reinstate previously defined permissions associated with the document 224, and revoke the restricted access to the document 224. For example, the user 220 may remove information corresponding to the at least one access blocking criterion from the document 224, remove offending users with access to the document 224, override the restricted access to the content, report a false positive associated with the information corresponding to the at least one access blocking criterion, and request one of a policy check or a reclassification.

In a first example, the user 220 may remove information corresponding, to at least one access blocking criterion from the document 224. Accordingly, the user may edit the document 224 to remove the credit card numbers by selecting an option to "edit" within the collaborative service user experience. Once the credit card numbers are removed, the document 224 no longer violates the DLP policy (e.g., the action no longer matches access blocking criteria defined by the policy rules 204), and on the next policy evaluation the block access tag may be deactivated or removed, previously defined permissions associated with the document 224 may be reinstated, and the restricted access to the document 224 may be revoked. In some embodiments, the reinstatement of permissions may be based on a current state of permissions. For example, if one or more permissions associated with the document 224 changed and/or were updated while the access to the document 224 was restricted, upon revocation of the restriction, the changed and/or updated permissions would be effective. The next policy evaluation may occur in response to any of an opening, saving, deleting, editing, copying, moving, publishing, uploading, downloading, printing, and/or sharing of the document 224 and/or upon an expiration of a predefined interval. Alternatively, the user 220 may request a policy check or a reclassification following the removal of the credit card numbers through the collaborative user experience to prompt the next policy evaluation.

In a second example, the user 220 may choose to remove offending users with access to the document 224 by removing any guest links to the document 224. The user 220 may select to view the properties of the document 224 and subsequently disable or remove a link to external users through the collaborative service user experience. Accordingly, external users with a guest link can no longer view or edit the document 224. On the next policy evaluation, the block access tag associated with the document 224 may be deactivated or removed, previously defined permissions associated with the document 224 may be reinstated, and the restricted access to the document 224 may be revoked as the document 224 no longer violates the DLP policy (e.g., the action no longer matches access blocking criteria defined by the DLP policy rules 204). As previously discussed in the first example, the user 220 may request a policy check or a reclassification following the removal of offending users with access to the document 224 through the collaborative user experience to prompt the next policy evaluation.

In a third example, the user 220 may choose to override the restricted access to the content. For example, there may be a justification for external vendors to access the document 224 because they require the data. The user may select an option to override the restricted access to the document 224 through an "override." control element displayed in the collaborative service user experience, and subsequently provide the justification through a user experience implement, such as a pop-up menu or a prompt, displayed through the collaborative service user experience. The user 220 may be notified that the override will be audited and the tenant administrator 202 will be able to view the justification, in response, the block access tag associated with the document 224 may be deactivated, the previously defined permissions associated with the document 224 may be reinstated, and the restricted access to the document 224 may be revoked. In some examples, an entry may be generated within an audit and/or server log to indicate when access to the document 224 is restricted, when restriction of access to the document 224 is revoked, and the override of the restriction of access to the content, for auditing and/or reporting purposes. On the next policy evaluation, the policy engine 228 may be aware that there is a block access override on the document 224 and skip additional policy application. However, if one or more of the DLP policy rules 204 are changed, the override and justification would be ignored or discarded, and access to the document 224 would be restricted again.

In a fourth example, the user 220 may choose to report a false positive associated with the information corresponding to the at least one access blocking criterion. For example, the detected sensitive information in the document 224 corresponding to the access blocking criterion may appear to be credit cards numbers due to a structure of the numbers, however, the numbers may simply be a random identification number unattached to any personal information. The user may select an option to report a false positive through a "report" control element displayed through the collaborative service user experience, and the block access tag associated with the document 224 may be deactivated or removed, the previously defined permissions associated with the document 224 may be reinstated, and the restricted access to the document 224 may be revoked. The user 220 may be notified that the sensitive information has been reported as a false positive, and will be tracked for auditing and/or reporting purposes. In some examples, an entry may be generated within an audit and/or server log to indicate when access to the document 244 is restricted, when the restricted access to the document 244 is revoked, and the report of the false positive associated with the sensitive information. On the next policy evaluation, the policy engine 228 may be aware that there is a reported false positive on the document 224 and skip additional policy application. However, if one or more of the DLP policy rules are changed, the reported false positive would be ignored, and the document 224 would be restricted again.

Figure 3:
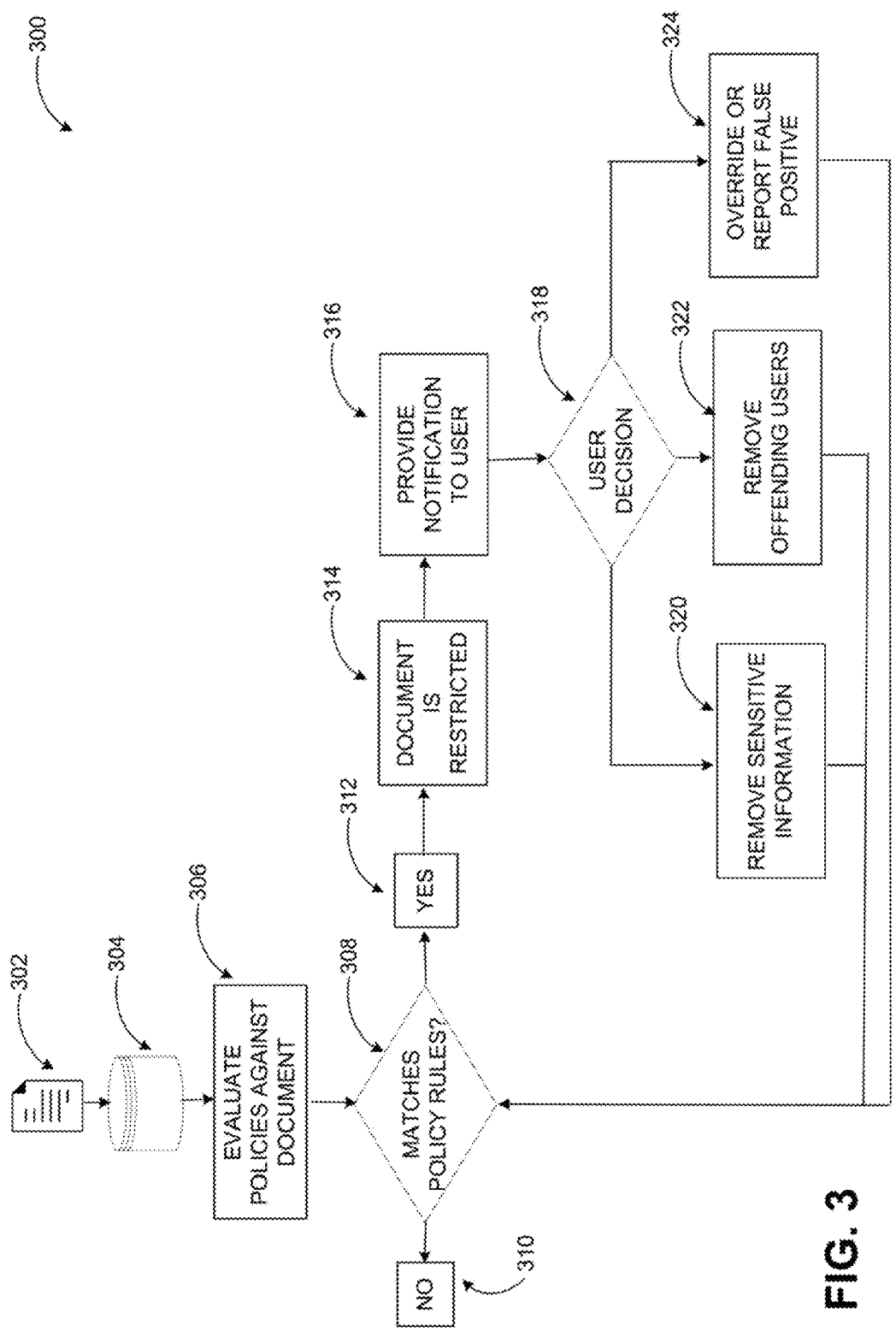
FIG. 3 illustrates an example access blocking process implemented as part of DLP within a collaborative service environment.

FIG. 3 illustrates an example access blocking process implemented as part of DLP within a collaborative service environment. A tenant may provide access to a number of applications executed within an infrastructure provided by a collaborative service to one or more users. The applications may include any application such as word processing applications, spreadsheet applications, presentations applications, communication applications, imaging applications, audio/video processing applications, graphic processing applications, and comparable ones. The applications may enable the users to open, create, edit, save, delete, move, upload, download, publish, print, and share content, such as a document 302. Furthermore, a tenant administrator may be enabled to configure DLP policies in the collaborative service to mitigate their organization's information disclosure risks, alone with the detection and remediation of sensitive information.

As shown in a diagram 300, the document 302 may be saved and uploaded by a user to a location for storage 304. The document 302 may then be evaluated 306 against a. DLP policy created by the tenant administrator, where the DLP policy includes one or more DLP policy rules. For example, in the evaluation, an action associated with the document 302 may be detected, and it may be determined if the action matches access blocking criteria defined by the DLP policy rules 308. In response to a determination that the action does not match any access blocking criteria 310, the access blocking process may be terminated. In response to a determination that the action matches at least one of the access blocking criteria 312, a block access tag associated with the document 302 may be activated, previously defined permissions associated with the document 102 may be ignored or additional constraints to the permissions may be applied, and access to the document 302 may be restricted 314 to a number of predefined users. The predefined users may include an owner/user who uploaded the document 302, a last modifier of the document 302, and an administrator, for example. The predefined users may also include other users that belong to a role defined for managing restricted content. In other embodiments, access to the content may be restricted to one or more users based on the matched access blocking criteria defined by DLP policy rules.

Furthermore, a notification may be provided to the user 316 through a collaborative service user experience to indicate the restricted access to the document 302. The notification may include a link to a DLP policy document that includes the DLP policy rules, a link to a location of the document 302, and various control elements associated with one or more actions for user decision 318, which may be implemented in order to deactivate the block access tag associated with the document 302, reinstate previously defined permissions associated with the document 302, and/or revoke the restricted access to the document 302. In some embodiments, the reinstatement of permissions may be based on a current state of permissions. For example, if one or more permissions associated with the document 302 changed and/or were updated while the access to the document 302 was restricted, upon revocation of the restriction, the changed and/or updated permissions would be effective. The actions may include removal of information corresponding to the at least one access blocking criterion, such as sensitive information, 320 from the document 302, removal of offending users 322 with access to the document 302, and an override of the restricted access to the document 302 or a report of a false positive associated with the information corresponding to the at least one access blocking criterion 324. Additionally or alternatively, the user may choose to do nothing to the document 302 causing the restricted access to the document 302 to persist, delete the document 302, move the document 302, or share the document 302, among other actions.

On the next evaluation 306, it may be determined if the action matches access blocking criteria defined by the DLP policy rules 308. If the action does not match the access blocking criteria 310, the block access to may be deactivated, previously defined permissions associated with the document 302 may be reinstated, and/or the restricted access to the document 302 may be revoked. In some examples, to prompt the next evaluation 306, the user may immediately request a policy check or a reclassification following the execution of the user action through the collaborative service user experience.

In some embodiments, the block access tag associated with the document 302 may be enabled in the collaborative service, and all previous document permissions may be ignored. Furthermore, the block access tag associated with the content may be persisted to an index of the collaborative service such that when external users without access to the content are searching the collaborative service, the access to the content remains restricted. User reported overrides or false positives may result in all previous document permissions to be applicable again.

Figure 4A:
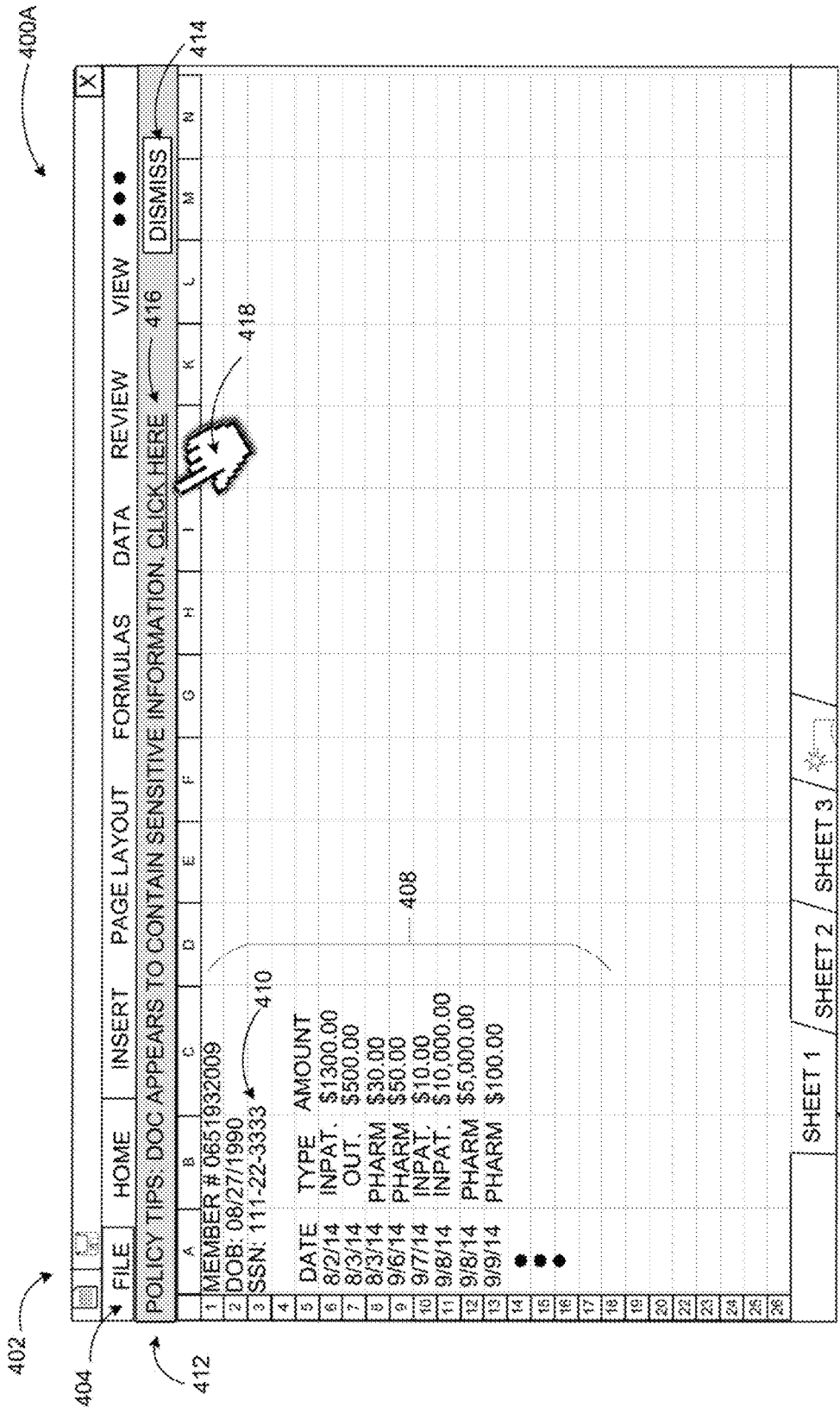
FIGS. 4A and 4B illustrate example user experiences associated with an access block.
Figure 4B:
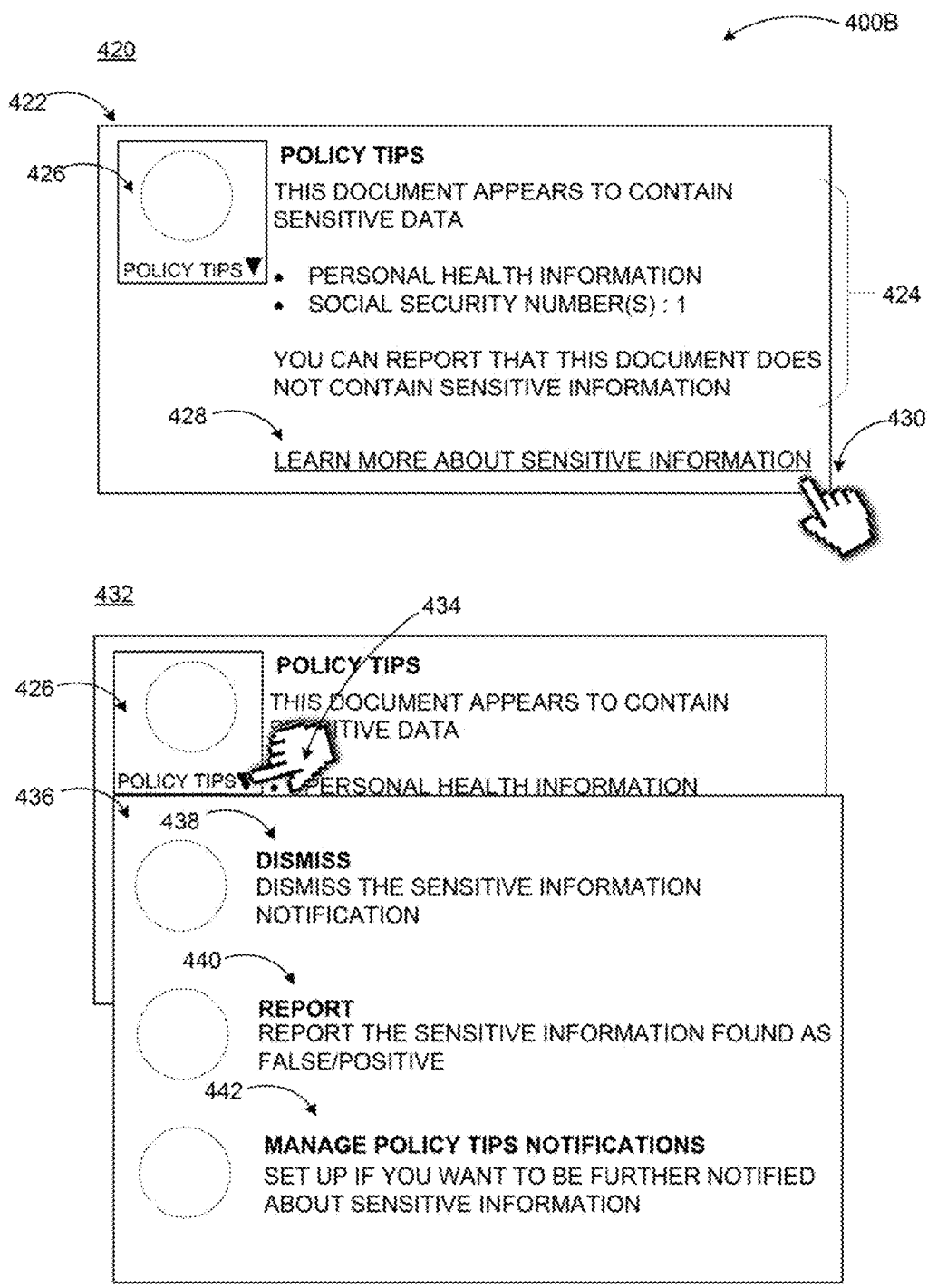

FIGS. 4A and 4B illustrate example user experiences associated with an access block. As previously discussed, a tenant may provide access to a number of applications executed within the infrastructure provided by a collaborative service to their users, where the application may be a spreadsheet application 402, for example. Furthermore, a tenant administrator may be enabled to configure DLP policies in the collaborative service to mitigate their organization's information disclosure risks, along with the detection and remediation of sensitive information.

As shown in FIG. 4A, diagram 400A, the spreadsheet application 402 may enable a user to enter data into one or more columns and rows through interaction with one or more control elements provided through a toolbar 404, such that the user may organize, analyze, and store data in a tabular form within a spreadsheet document 406. For example, the user may enter data 408 associated with health insurance claims into the spreadsheet document 406, where the columns represent a date, a type, and an amount of the claim respectively, and the rows may represent each date and its corresponding type and amount of the claim. The user may also enter personal health information (PHI) of an insurance member associated with the claims, such as a member number, a date of birth, and a Social Security number 410, for example, into the spreadsheet document 406.

In response to an implicit or explicit save of the spreadsheet document 406 to a location for storage, the spreadsheet document 406 may be evaluated against one or more DLP policy rules created by the tenant administrator. For example, in the evaluation, the insertion of the Social Security number 410 within the data 408 may be detected, and a determination may be made if the insertion of the Social Security number 410 matches access blocking criteria defined by the DLP policy rules. In this scenario, the insertion of the Social Security number 410 may be considered insertion of sensitive information, and therefore, a match to at least one access blocking criterion defined by the DLP policy rules may be determined, in response to determining the match, a block access tag associated with the spreadsheet document 406 may be activated, previously defined permissions associated with the spreadsheet document 406 may be ignored or additional constraints may be applied, and access to the spreadsheet document 406 may be restricted to a number of predefined users.

A notification 412 may be provided to the user through a user experience of the spreadsheet application 402 to indicate the restricted access to the spreadsheet document 406. For example, a policy tip indicating that the spreadsheet document 406 appears to contain sensitive information may be provided to the user. The notification may include a "dismiss" control element 414 that the user may select if the user wishes to do nothing in regards to the restricted access to the spreadsheet document 406. The notification may also include a link. 416 that the user may select 418 to learn more information about the restricted access or associated DLP policy or DLP policy rules.

In response to the user selection 418 of the link 416, another view comprising a policy tips menu 422 may be presented to the user through the user experience of the spreadsheet application 402, as shown in FIG. 4B, diagram 400B, configuration 420. Although not illustrated, the view may include various other menus associated with other capabilities of the spreadsheet application 402 in addition to the policy tips menu 422. The policy tips menu 422 may include text 424 describing the at least one access blocking criterion matched, such as sensitive data, and information within the spreadsheet document 406 that corresponds to it, such as the personal health information, and Social Security number. The policy tips menu 422 may also include a "policy tips" control element 426, and a link 428 that when selected by the user 430 may redirect the user to a DLP policy document that includes the DLP policy rules.

The user may also be enabled to hover over and/or select 434 the "policy tips" control element 426, as shown in FIG. 4B, diagram 400B, configuration 432. Upon selection of the "policy tips" control element 426, a drop-down menu 436 comprising one or more options for user action may be presented. For example, the user actions may include to dismiss the notification 438, report the sensitive information found as a false positive 440, and manage the notification 442 for future instances when sensitive information, such as a Social Security number, is detected.

Figure 5A:
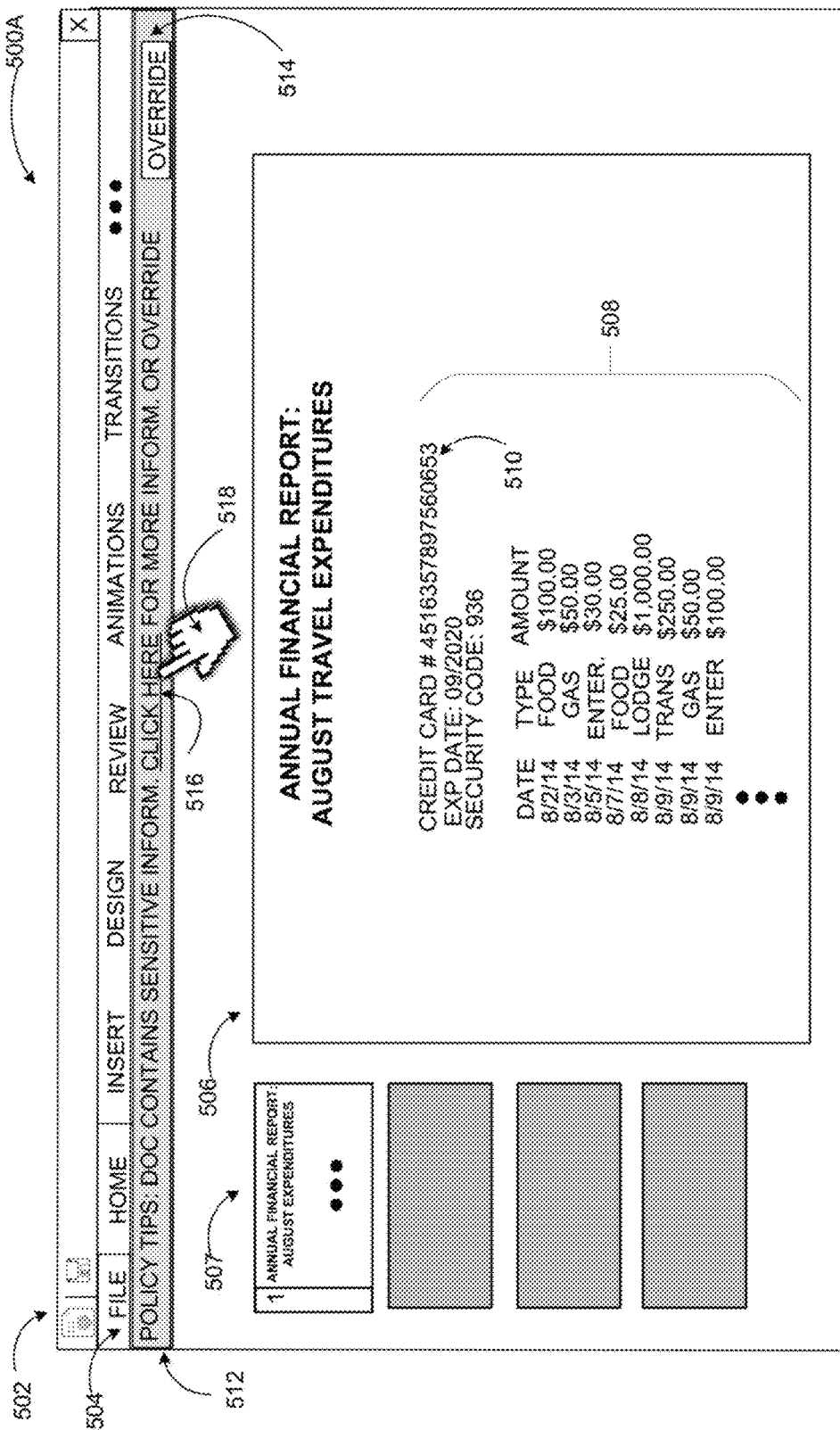
FIGS. 5A-C, illustrate example user experiences associated with a user override of an access block.
Figure 5B:
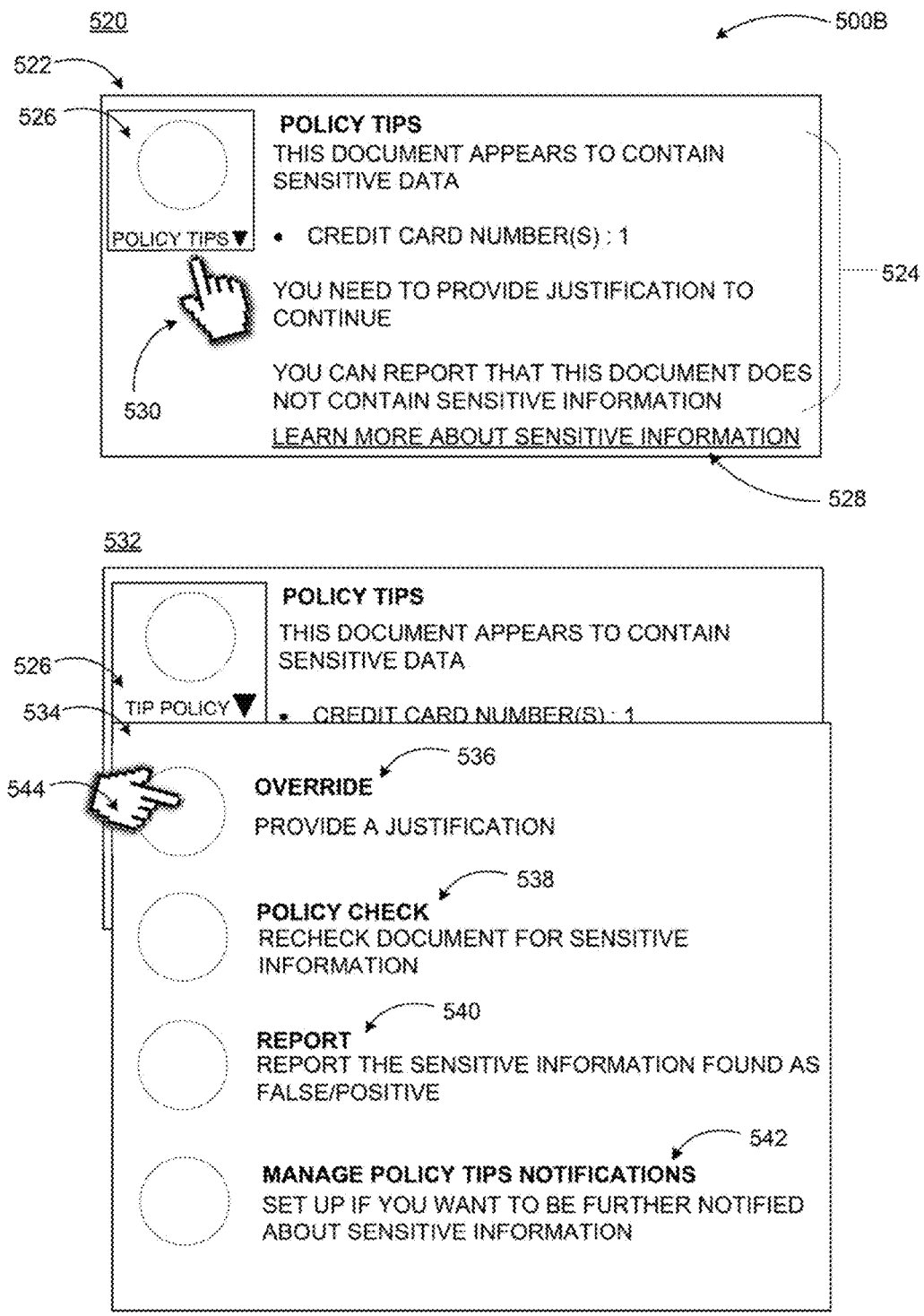
Figure 5C:
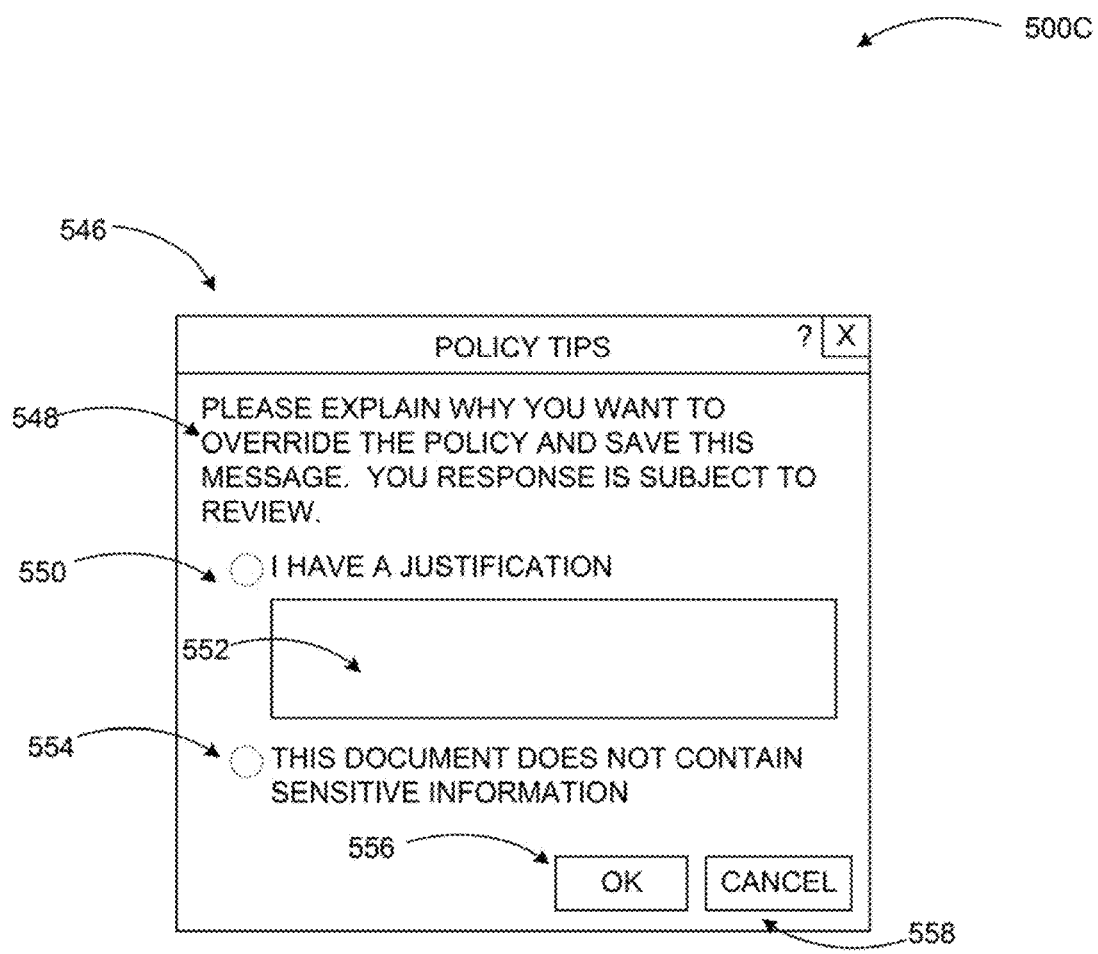

FIGS. 5A-C illustrate example user experiences associated with a user override of an access block. A tenant may provide access to a number of applications executed within the infrastructure provided by a collaborative service to their users, where the application may be a presentation application 502, for example. Furthermore, a tenant administrator may be enabled to configure DLP policies in the collaborative service to mitigate their organization's information disclosure risks, along with the detection and remediation of sensitive information.

As shown in FIG. 5A, diagram 500A, the presentation application 502 may enable a user to create, save, edit, and/or share content with one or more other users through interaction with one or more control elements provided through a toolbar 504 on as user experience of the presentation application 502. For example, the user may create a document 506 comprising multiple slides 507, where each slide is associated with monthly travel expenditures for an annual financial report. Data 50 within the document 506 may include a date, a type, and an amount of the travel expenditure respectively. The user may also include credit card information associated with the travel expenditures, such as a credit card number 510, a date of expiration, and a security code, for example, within the document 506.

At an expiration of a pre-defined time interval following one or more of the opening, saving, deleting, editing, copying, moving, publishing, uploading, downloading, printing, and/or sharing of the document 506, the document 506 may be evaluated against one or more DLP policies created by the tenant administrator. For example, the insertion of the credit card number 510 within the data 508 may be detected, and a determination may be made if the insertion of the credit card number 510 matches access blocking criteria defined by the DLP policy rules. In this scenario, the insertion of the credit card number 510 may be considered insertion of sensitive information, and therefore, a match to at least one access blocking criterion defined by the DLP policy rules may be determined. In response to determining the match, a block access tag associated with the document 506 may be activated, previously defined permissions associated with the document 506 may be ignored, and access to the document 506 may be restricted to a number of predefined users. The predefined users may include an owner of the document 506 (e.g., the user in this example), a last modifier of the document 506, and/or an administrator, such as the tenant administrator, among others.

A notification 512 may be provided to the user through the user experience of the presentation application 502 to indicate the restricted access to the document 506. For example, a policy tip indicating that the document 506 contains sensitive information may be provided to the user. The notification 512 may include an "override" control element 514 that the user may select if the user wishes to override the restricted access to the document 506. The notification may also include a link 516 that the user may select 518 to learn more information about the restricted access.

In response to the user selection 518 of the link 516, another view comprising a policy tips menu 522 may be presented to the user through the user experience of the presentation application 502, as shown in FIG. 5B, diagram 500B, configuration 520. Although not illustrated, the view may include multiple other menus associated with other capabilities of the presentation application 502 in addition to the policy tips menu 522. The policy tips menu 522 may include text 524 describing the at least one access blocking criterion matched, such as sensitive data, and what information corresponds to it, such as the credit card number. The policy tips menu 422 may also include a "policy tips" control element 526, and a link 528 that when selected by the user may redirect the user to a DLP policy document that includes the DLP policy rules. The user may be enabled to hover over and/or select 530 the "policy tips" control element 526.

Upon selection of the "policy tips" control element 526, a drop-down menu 534 comprising one or more options for user action may be presented, as shown in FIG. 5B, diagram 500B, configuration 532. For example, the user actions may include overriding 536 the restricted access to the document 506, requesting a policy check 538 to confirm the sensitive information found, reporting the sensitive information found as a false positive 540, and managing the notification 542 for future instances when sensitive information, such as a credit card number, is detected.

In response to user selection 544 to override 536 the restricted access to the document 506, a dialog 546 may be displayed through the user experience of the presentation application 502, as shown in FIG. 5C, diagram 500C. A similar dialog may be presented to the user, if the user had selected the "override" control element 514 within the notification 512 described in the previous FIG. 5A. The dialog 546 may include text 548 prompting the user to justify why the user wants to override the restriction, and indicating that the justification is subject to review by the tenant administrator, for example. If the user has a justification for overriding, the user may select option 550, enter the justification within a text box provided 552, and select OK 556. The user may then be notified that the override will be audited and reported upon. If the user believes the document 506 does not include sensitive information, and thus, would like to report as false positive, the user may select option 554 and select OK 556. The user may then be notified that the report will be audited. If the user no longer wishes to override the document 506 or report a false positive, the user may select cancel 558.

Figure 6A:
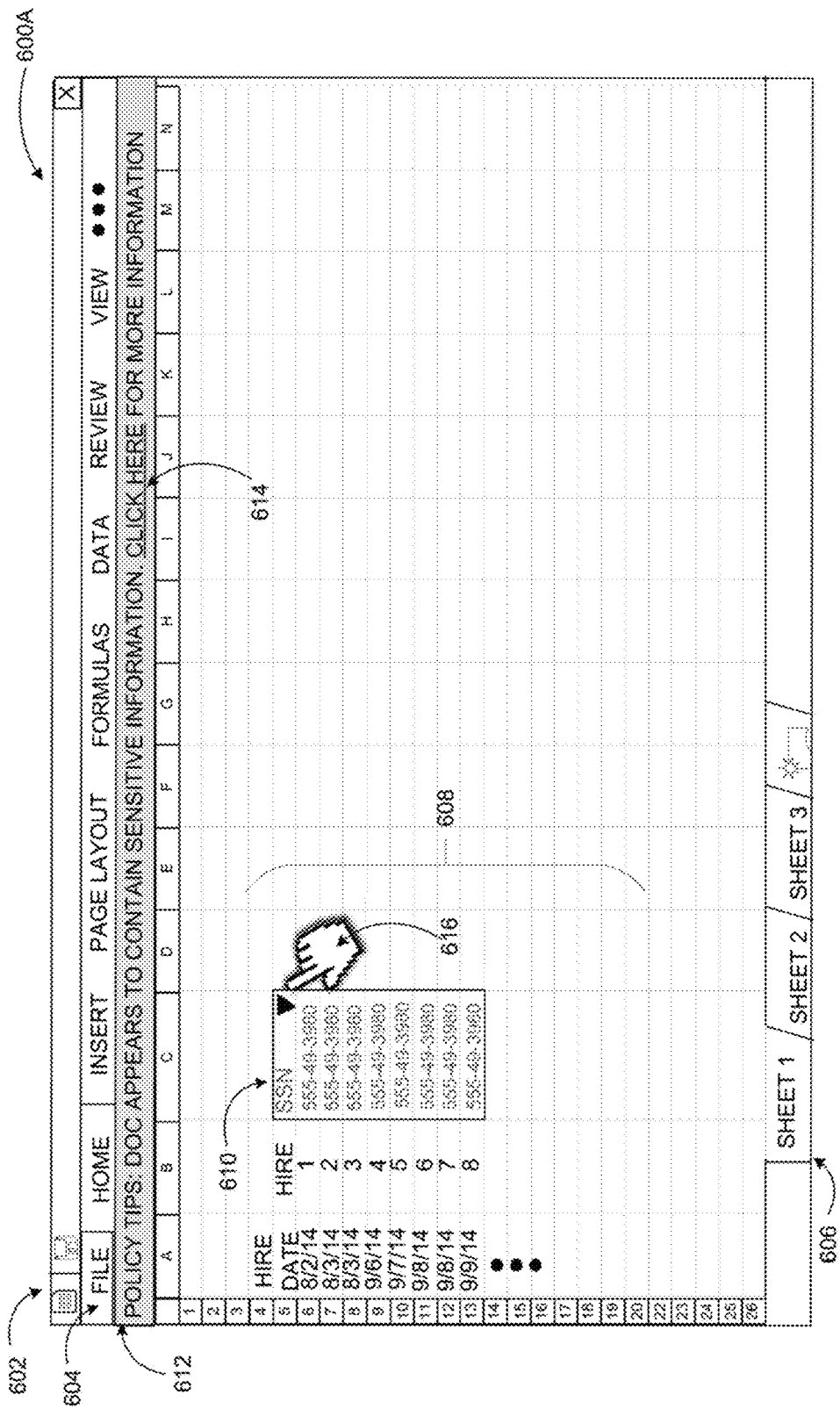
Figure 6C:
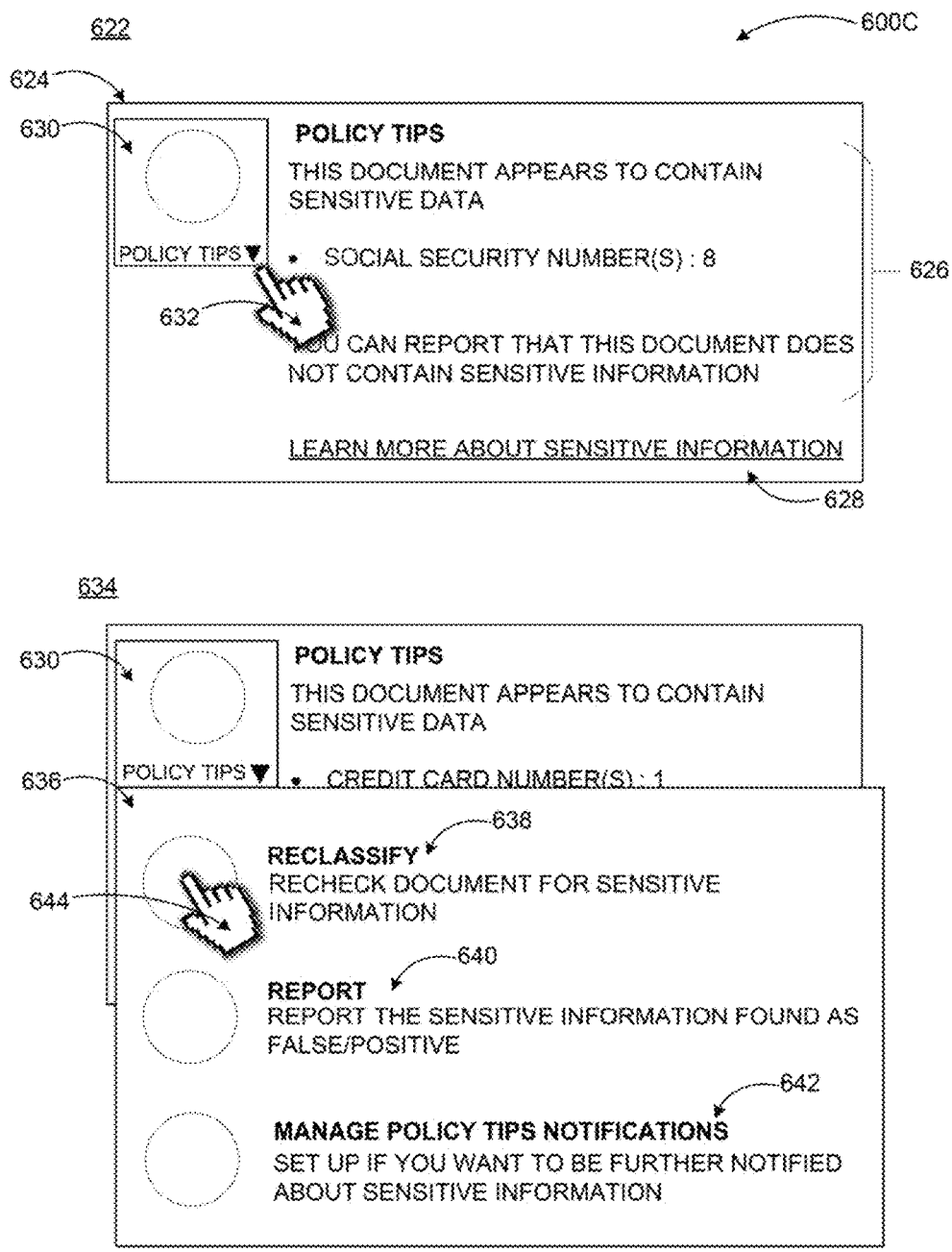

FIGS. 6A-C illustrate example user experiences associated with a user reclassification of an access block following removal of content. A tenant may provide access to a number of applications executed within the infrastructure provided by a collaborative service to their users, where the application may be a spreadsheet application 602, for example. Furthermore, a tenant administrator may be enabled to configure DLP policies in the collaborative service to mitigate their organization's information disclosure risks, along with the detection and remediation of sensitive information.

As shown in FIG. 6A, diagram 600A, the spreadsheet application 602 may enable a user to enter data into one or more columns and rows through interaction with one or more control elements provided through a toolbar 604, such that the user may organize, analyze, and store data in a tabular firm within a spreadsheet document 606. For example, the user may enter data 608 associated with recent employee hires into the spreadsheet document 606, where the columns represent a hire date, an identifier of the hired employee, and a Social Security number 610 of the hired employee, and the rows may represent each hire date of the employees and a corresponding identifier and Social Security number of the employee hired on that date.

In response to the user opening the spreadsheet document 606 to view and/or edit the document, the spreadsheet document 606 may be evaluated against one or more DLP policies created by the tenant administrator. For example, the inclusion of the Social Security numbers 610 within the data 608 may be detected, and a determination may be made if the inclusion of the Social Security numbers 610 matches access blocking criteria defined by the DLP policy rules. In this scenario, the inclusion of the Social Security numbers 610 may be considered inclusion of sensitive information, and therefore, a match to at least one access blocking criterion defined by the DLP policy rules may be determined. In response to determining the match, a block access tag associated with the spreadsheet document 606 may be activated, previously defined permissions associated with the spreadsheet document 606 may be ignored, and access to the spreadsheet document 606 may be restricted to a number of predefined users. The predefined users may include an owner of the spreadsheet document 606 (e.g., the user in this example), a last modifier of the spreadsheet document 606, and/or an administrator, such as the tenant administrator, among others.

A notification 612 may be provided to the user through a user experience of the spreadsheet application 602 to indicate the restricted access to the spreadsheet document 606. For example, a policy tip indicating that the spreadsheet document 606 contains sensitive information may be provided to the user. The notification may also include a link 614 that the user may select to learn more information about the restricted access. After receiving the notification 612, the user may choose to remove the sensitive information from the data 608 such that the block access tag associated with the spreadsheet document 606 may be deactivated or removed, the previously defined permissions associated with the spreadsheet document 606 may be reinstated, and/or the restricted access to the spreadsheet document 606 may be revoked. Therefore, the user may select 616 the Social Security numbers 610 and remove them from the spreadsheet document 606.

Following removal of the Social Security numbers 610 from the spreadsheet document 606, the new data 618 may represent each hire date and a corresponding identifier of the employee hired on each date, as shown in FIG. 6B, diagram 600B. The user may now wait until the next policy evaluation on the spreadsheet document 606 is performed for the block access tag associated with the spreadsheet document 606 to be deactivated or removed, the previously defined permissions associated with the spreadsheet document 606 to be reinstated, and/or the restricted access to the spreadsheet document 606 to be revoked. The next policy evaluation may be in response to saving the spreadsheet document 606, sharing the spreadsheet document 606, an expiration of a predefined time interval, and/or a variety of other actions altering the content, location or state of the spreadsheet document 606. Alternatively, the user may select 620 the link 614 to prompt the next policy evaluation.

In response to the user selection 620 of the link 614, another view comprising a policy tips menu 624 may be presented to the user through the user experience, of the spreadsheet application 602, as shown in FIG. 6C, diagram 600C, configuration 622. Although not illustrated, the view may include multiple other menus associated with other capabilities of the spreadsheet application 602 in addition to the policy tips menu 624. The policy tips menu 624 may include text 626 describing the at least one access blocking criterion matched, such as sensitive data, and what information corresponds to it, such as the Social Security number. The policy tips menu 624 may also include a "policy tips" control element 630, and a link 628 that when selected by the user may redirect the user to a DLP policy document that includes the DLP policy rules. The user may be enabled to hover over and/or select 632 the "policy tips" control element 630.

Upon selection of the "policy tips" control element 630, a drop-down menu 636 comprising one or more options for user action may be presented, as shown in configuration 634. For example, the user actions may include to reclassify 638 to recheck the document for sensitive information, report the sensitive information found as a false positive 640, and manage the notification 642 for future instances when sensitive information, such as a Social Security number, is detected.

In response to user selection 644 to reclassify 638, another policy evaluation may be performed to evaluate the spreadsheet document 606 against the DLP policies to determine if there are any matches to access blocking criteria defined by the DLP policy rules. Due to the removal of the sensitive information by the user, there may be no matches determined, and upon reclassification, the block access tag associated with the spreadsheet document 606 may be deactivated or removed, the previously defined permissions associated with the spreadsheet document 606 may be reinstated, and/or the restricted access to the spreadsheet document 606 may be revoked.

Figure 7:
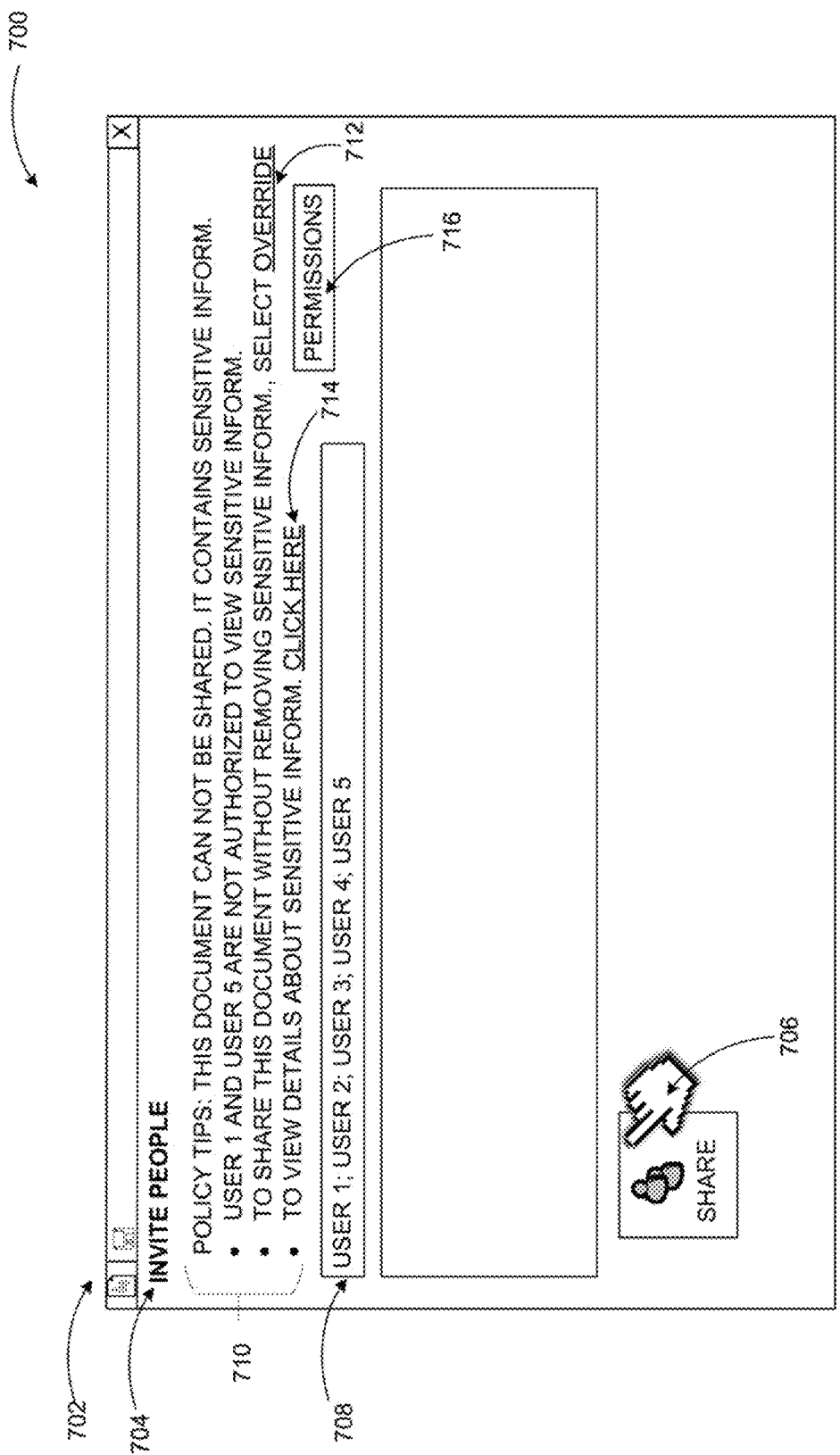
FIG. 7 illustrate example user experiences associated with a user sharing content with an access block.

FIG. 7 illustrates example user experiences associated with a user sharing content with an access block. A tenant may provide access to a number of applications executed within the infrastructure provided by a collaborative service to their users, where the application may be a word processing application 702, for example. Furthermore, a tenant administrator may be enabled to configure DLP policies in the collaborative service to mitigate their organization's information disclosure risks, along with the detection and remediation of sensitive information.

As shown diagram 700, the word processing application 702 may enable a user to invite 704 one or more other users 708 to view and/or edit a document created within the word processing application 702 based on one or more permissions 716 set by the user. In response to the user attempting to share 706 the document with the other users 708 invited to view and/or edit the document, the document may be evaluated against one or more DLP policies created by the tenant administrator. For example, sensitive information within the document may be detected, and a determination may be made if the sensitive information within the document matches access blocking criteria defined by the DLP policy rules. In this scenario, the inclusion of the sensitive information may be a match to at least one access blocking criterion defined by the DLP policy rules. In response to determining the match, a block, access tag associated with the document may be activated, previously defined permissions associated with the document may be ignored, and access to the document may be restricted to a number of predefined users. The predefined users may include an owner of the document (e.g., the user in this example), a last modifier of the document, and/or an administrator, among others.

A notification 710 may be provided to the user through a user experience of the word processing application 702 to indicate the restricted access to the document. For example, a policy tip indicating that the document cannot be shared because it contains sensitive information may be provided to the user. The notification 710 may include an "override" control element 712 that the user may select if the user wishes to override the restricted access to the document without having to remove the sensitive information from the document. The notification may also include a link 714 to learn more information about the restricted access.

The examples in FIGS. 1 through 7 have been described using specific network environments, services, applications, and user experiences for provision of access blocking as part of DLP within a collaborative service environment. Embodiments for provision of access blocking as part of DLP within a collaborative service environment are not limited to the specific network environments, services, applications, and user experiences according to these examples.

DLP is a feature set that enables organizations to identify, monitor, and protect sensitive information through deep content analysis, where the DLP may be implemented in conjunction with collaborative services. Provision of access blocking as part of DLP may improve process security by restricting access to content comprising sensitive information to predefined users. Provision of access blocking may also reduce network bandwidth through the creation of automated tasks to evaluate content against one or more DLP policies created by a tenant administrators of the organizations. For example, in response to opening, saving, deleting, editing, copying, moving, publishing, uploading, downloading, printing, and/or sharing of the content, and/or at an expiration of a predefined time interval, the content may be evaluated, sensitive information may be detected within content, and access to the content may be restricted.

Additionally, enabling the predefined users to interact with a user experience of the collaborative service to perform one or more actions associated with the blocked access may advantageously improve user efficiency, as well as increase user interaction performance. Furthermore, enabling, the user to actuate and view the links provided with the notification through the user experience of the collaborative service may educate the user about an organization, such as their place of employment, DLP policies associated with the organization, and how user actions may affect the organization.

Figure 8:
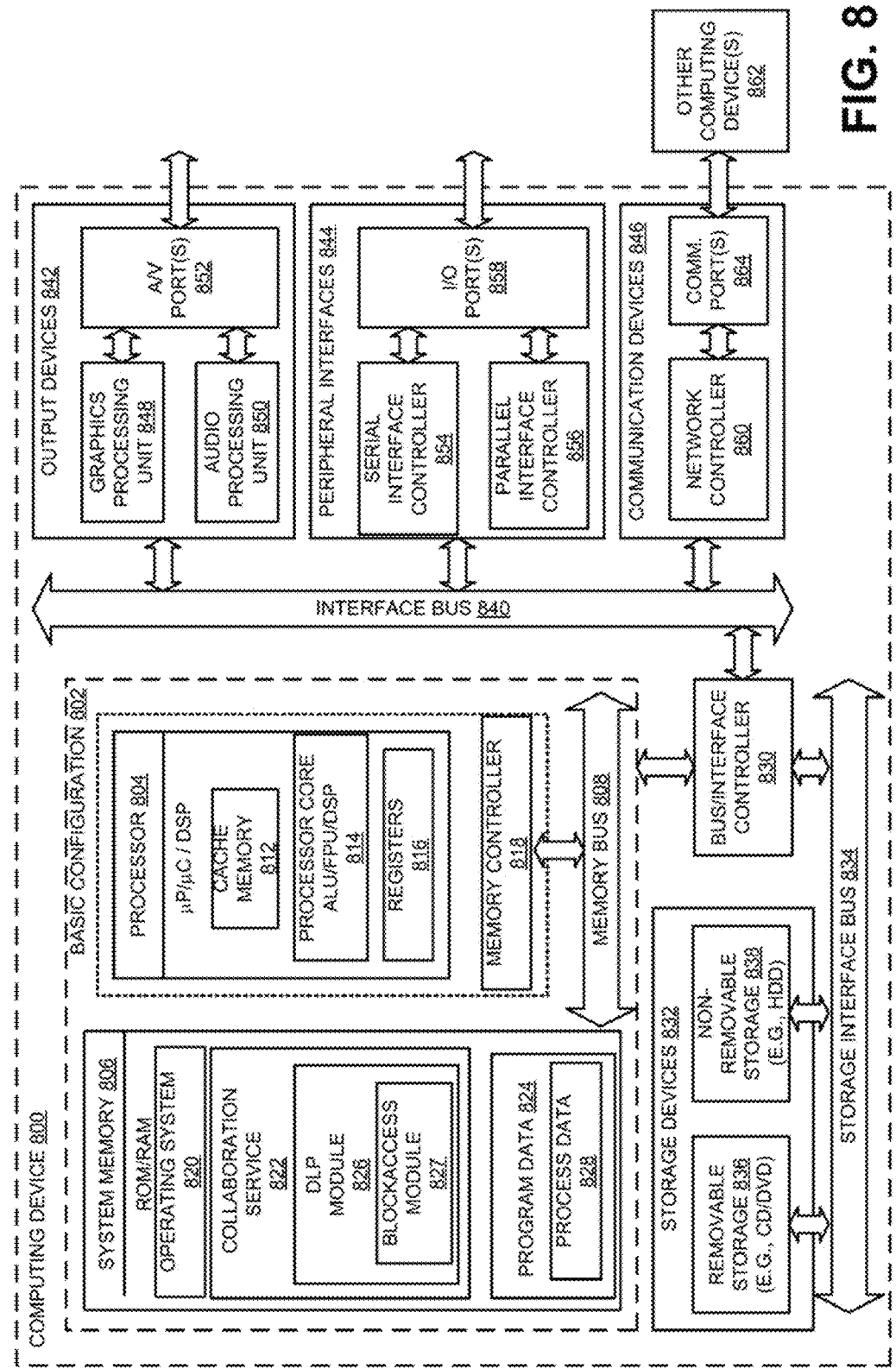
FIG. 8 is a block diagram of an example general purpose computing device, which may be used to provide access blocking as part of DLP within as collaborative service environment.

FIG. 8 and the associated discussion are intended to provide a brief, general description of a general purpose computing device, which may be used to provide access blocking as part of DLP within a collaborative service environment.

For example, computing device 800 may be used as a server, desktop computer, portable computer, smart phone, special purpose computer, or similar device. In an example basic configuration 802, the computing device 800 may include one or more processors 804 and a system memory 806. A memory bus 808 may be used for communicating between the processor 804 and the system memory 806. The basic configuration 802 is illustrated in FIG. 8 by those components within the inner dashed line.

Depending on the desired configuration, the processor 804 may be of any type, including but not limited to a microprocessor (µP), a microcontroller (µC), a digital signal processor (DSP), or any combination thereof. The processor 804 may include one more levels of caching, such as a level cache memory 812, one or more processor cores 814, and registers 816. The example processor cores 814 may (each) include an arithmetic logic unit (ALU), a floating point unit (FPU), a digital signal processing core (DSP Core), or any combination thereof. An example memory controller 818 may also be used with the processor 804, or in some implementations the memory controller 818 may be an internal part of the processor 804.

Depending on the desired configuration, the system memory 806 may be of any type including but not limited to volatile memory (such as RAM), non-volatile memory (such as ROM, flash memory, etc.) or any combination thereof. The system memory 806 may include an operating system 820, a collaborative service 822, and program data 824. The collaborative service 822 may include a DLP module 826 and a block access module 827, which may be integrated modules of the collaborative service 822 or independent modules. The DLP module 826 and the block access module 827 may perform tasks associated with providing access blocking as part of DLP in a collaborative environment as described herein. The program data 824 may include, among other data, process data 828 related to restricted content, etc., as described herein.

The computing device 800 may have additional features or functionality, and additional interfaces to facilitate communications between the basic configuration 802 and any desired devices and interfaces. For example, a bus/interface controller 830 may be used to facilitate communications between the basic configuration 802 and one or more data storage devices 832 via a storage interface bus 834. The data storage devices 832 may be one or more removable storage devices 836, one or more non-removable storage devices 838, or a combination thereof. Examples of the removable storage and the non-removable storage devices include magnetic disk devices such as flexible disk drives and hard-disk drives (HDDs), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 806, the removable storage devices 836 and the non-removable storage devices 838 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 800. Any such computer storage media may be part of the computing device 800.

The computing device 800 may also include an interface bus 840 for facilitating communication from various interface devices (for example, one or more output devices 842, one or more peripheral interfaces 844, and one or more communication devices 846) to the basic configuration 802 via the bus/interface controller 830. Some of the example output devices 842 include a graphics processing unit 848 and an audio processing unit 850, which may be con figured to communicate to various external devices such as a display or speakers via one or more A/V ports 852. One or more example peripheral interfaces 844 may include a serial interface controller 854 or a parallel interface controller 856, which may be configured to communicate with external devices such as input devices (for example, keyboard, mouse, pen, voice input device, touch input device, etc.) or other peripheral devices (for example, printer, scanner, etc.) via one or more I/O ports 858. An example communication device 846 includes a network controller 860, which may be arranged to facilitate communications with one or more other computing devices 862 over a network communication link via one or more communication ports 864. The one or more other computing devices 862 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 800 may be implemented as a part of a general purpose or specialized server, mainframe, or similar computer that includes any of the above functions. The computing device 800 may also be implemented as a personal computer including both laptop computer and non-laptop computer configurations.

Example embodiments may also include methods to provide access blocking as part of DLP within a collaborative service environment. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 9:
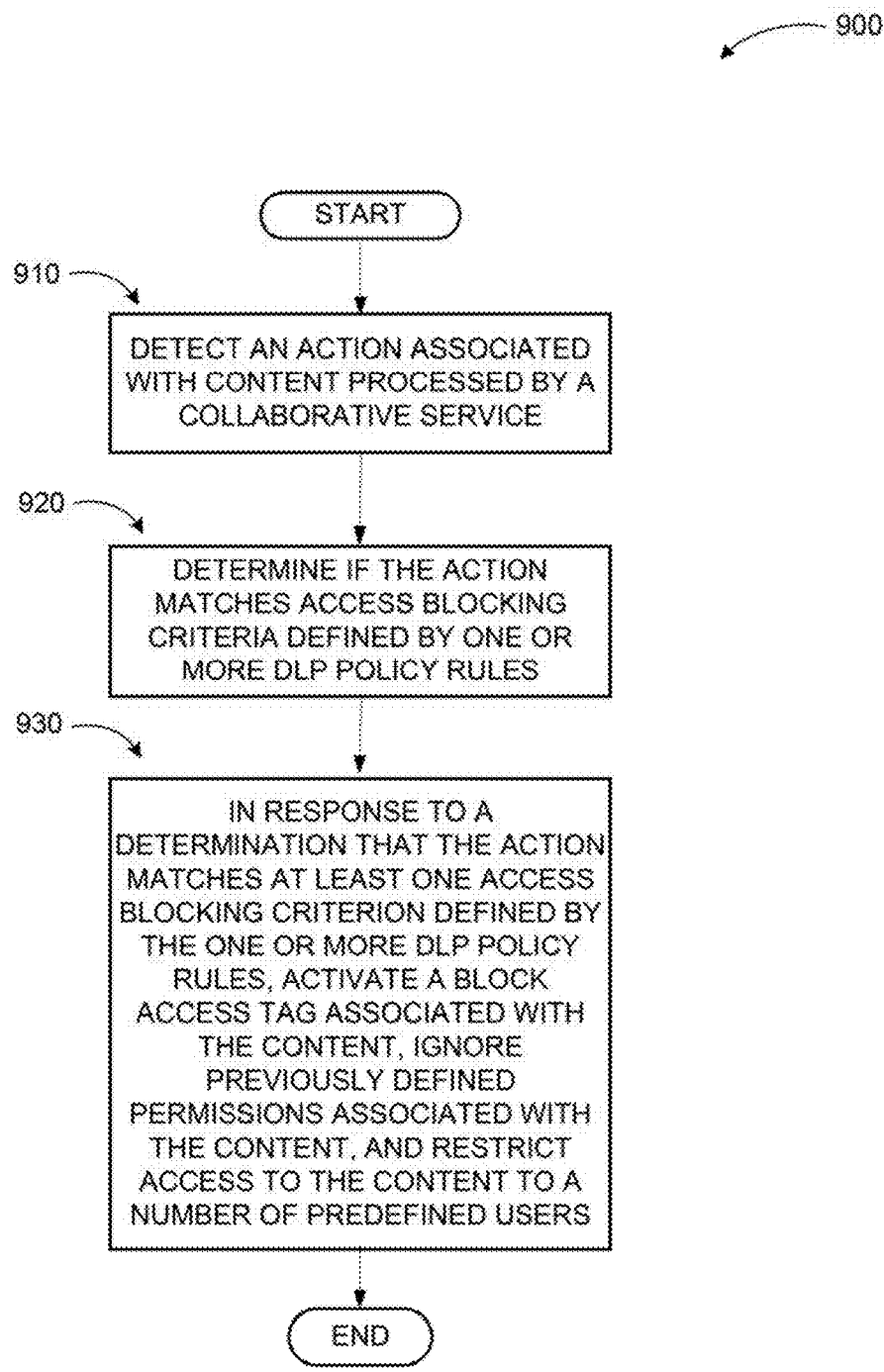
FIG. 9 illustrates a logic flow diagram of a method to provide access blocking as part of DLP within a collaborative service environment, according to embodiments.

FIG. 9 illustrates a logic flow diagram for process 900 of a method to provide access blocking as part of DLP within a collaborative service environment, according to embodiments. Process 900 may be implemented on a server or other system.

Process 900 begins with operation 910, where an action associated with content processed by a collaborative service is detected. The action may include insertion of sensitive information within the content, such as credit card numbers, Social Security numbers, or other forms of sensitive information, for example.

At operation 920, a determination of whether the action matches access blocking criteria defined by one or more DLP policy rules is made. The detection and determination may be made by one of a DLP module associated with the collaboration service in a server-side environment, or by a classification engine and policy engine, respectively, associated with a client in a client-side environment.

At operation 930, in response to determination that the action matches at least one of the access blocking criterion defined by the DLP policy rules, a block access to associated with the content may be activated, previously defined permissions associated with the content may be ignored or additional constraints to the permissions may be applied, and access to the content may be restricted to a number or predefined users. The predefined users may include an owner, an administrator, and last modifier, and the restricted access to the content may include read, edit, and share permissions. The predefined users may also include one or more users that belong to a role defined for managing content with restricted access, or in other embodiments, access to the content may be restricted to one or more users based on the matched access blocking criteria defined by DLP policy rules. A notification may be provided to one or more of the predefined users to indicate the restricted access to the content, where the notification may include a link to a DLP policy document that includes the one or more DLP policy rules, a link to a location of the content, specific details of the detected sensitive content, and various control elements associated with one or more actions for the predefined user to implement in order to release the content from restriction The operations included in process 900 are for illustration purposes. Provision of access blocking as part of DLP within a collaborative service environment may be implemented by similar processes with fewer or additional steps, as well as in different order of operations using the principles described herein.

A means for providing access blocking as part of DLP within a collaborative service environment may include a means for detecting an action associated with content processed by the collaborative service, determining if the action matches access blocking criteria defined by one or more DLP policy rules, and in response to a determination that the action matches at least one access blocking criterion defined by the one or more DLP policy rules, activating a block access tag associated with the content, ignore previously defined permissions associated with the content, and restrict access to the content to a number of predefined users.

According to some examples, a computing device to provide access blocking as part of data loss prevention (DLP) within a collaborative service environment may be described. An example computing device may include a memory configured to store instructions, and a processor coupled to the memory. The processor may be configured to perform actions including detect an action associated with content processed by a collaborative service, determine if the action matches access blocking criteria defined by one or more DLP policy rules, and in response to a determination that the action matches at least one access blocking criterion defined by the one or more DLP policy rules, activate a block access tag associated with the content, ignore previously defined permissions associated with the content, and restrict access to the content to a number of predefined users.

In other examples, the predefined users may include an owner, an administrator, and/or a last modifier. The restricted access to the content may include read, edit, and/or share permissions. The detected action may include insertion of sensitive information into the content. The action may be detected as a part of an evaluation of the content in response to an opening of the content, an editing of the content, a sharing of the content, a copying of the content, a moving of the content, a publishing of the content, a saving of the content, a printing of the content, an uploading of the content, a downloading of the content, or an expiration of a predefined time interval.

In further examples, a notification may be provided to the predefined users through a user experience of the collaborative service to indicate the restricted access to the content. The notification may include a link to a DLP policy document that includes the one or more DLP policy rules, a link to a location of the content, and/or various control elements associated with one or more actions for the predefined users to implement in order to deactivate or remove the block access tag associated with the content, reinstate previously defined permissions associated with the content, and revoke the restricted access to the content. The computing device may be associated with a client, and the processor may be configured to execute a classification engine and/or a policy engine to perform the one or more actions.

According to some embodiments, a system to provide access blocking as part of data loss prevention (DLP) within a collaborative service environment may be described. An example system may include a first computing device configured to provide access to one or more applications within the collaborative service, and a second computing device configured to manage the DLP within the collaborative service. The second computing device may be configured to execute an access blocking module configured to detect an action associated with content processed by the collaborative service, determine if the action matches access blocking criteria defined by one or more DLP policy rules, and in response to a determination that the action matches at least one access blocking criterion defined by the one or more DLP policy rules, activate a block access tag associated with the content, ignore previously defined permissions associated with the content, and restrict access to the content to a number of predefined users.

In other embodiments, the second computing device may be further configured to enable the predefined users to remove information corresponding to the at least one access blocking criterion from the content, remove offending users with access to the content, override the restricted access to the content and provide a business justification for the override, report a false positive associated with the information corresponding to the at least one access blocking criterion from the content, and/or request to policy check or a reclassification through a collaborative service user experience. The second computing device may be further configured to deactivate the block access tag associated with the content, reinstate previously defined permissions associated with the content, and revoke the restricted access to the content in response to one or more of detecting the removal of the information corresponding to the at least one access blocking criterion from the content, detecting the removal of the offending users with access to the content, and detecting one of the override and the reported false positive by the predefined users.

According to some examples, a method to provide access blocking as part of DLP within a collaborative service environment may be provided. An example method may include detecting sensitive information within content processed by the collaborative service, determining if the sensitive information matches access blocking criteria defined by one or more DLP policy rules, and in response to a determination that the sensitive information matches at least one access blocking criterion defined by the one or more DLP policy rules, activating a block access tag associated with the content, ignore previously defined permissions associated with the content, and restrict access to the content to a number of predefined users. The example method may also include providing a notification to the predefined users through a collaborative service user experience to indicate the restricted access to the content.

In other examples, the predefined users may be enabled to override the restricted access to the content through the collaborative service user experience. The predefined users may be enabled to report a false positive associated with the sensitive information through the collaborative service user experience. The predefined users may be enabled to share the content through the collaborative service user experience. The method may further include detecting removal of the information, detecting removal of offending users with access to the content, and/or detecting one of an override of the restricted access to the content and a reported false positive associated with the sensitive information by the predefined users; and deactivating the block access tag associated with the content, reinstating the previously defined permissions associated with the content, and/or revoking the restricted access to the content.

In further examples, a textual scheme, a graphical scheme, an audio scheme, an animation scheme, a coloring scheme, a highlighting scheme, and/or as shading scheme may be employed in the collaborative service user experience to indicate the content with restricted access. The block access tag associated with the content may be persisted to an index of the collaborative service.

The match, the restricted access to the content, an override of the restricted access to the content, and/or a reported false positive associated with the sensitive information may be recorded within a log associated with the collaborative service. An entry may be generated within an audit log and/or a server log to indicate when the access to the content is restricted, when the restricted access to the content is revoked, and/or if the restricted access to the content is overridden or the sensitive information is reported as a false positive by the predefined users.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to provide access blocking as part of data loss prevention (DLP) within a collaborative service environment, the method comprising:
   evaluating content of a user processed by a collaborative service, wherein the content is associated with an application executed within an infrastructure provided by the collaborative service;
   determining if information associated with the content matches access blocking criteria defined by one or more DLP policy rules;
   in response to a determination that a portion of the information matches at least one access blocking criterion defined by the one or more DLP policy rules, automatically activating a block access tag associated with the content to restrict access to the content;
   providing for display, on a user experience of the application that is displaying the content, a notification to the user, wherein the notification describes the at least one access blocking criterion and the portion of the information, and the notification includes a control element associated with an action to remove the portion of the information in order to deactivate the block access tag associated with the content;
   detecting a selection of the control element on the user experience by the user to remove the portion of the information that matches the at least one access blocking criterion defined by the one or more DLP policy rules from the content; and
   responsive to the removal, automatically deactivating the block access tag associated with the content to provide access to the content based on a determination that the information associated with the content does not match the access blocking criteria defined by the one or more DLP policy rules.

2. The method of claim 1, further comprising:
   deactivating the block access tag associated with the content to provide access to the content in response to receipt of a business justification to override the restricted access to the content.

3. The method of claim 1, further comprising:
   deactivating the block access tag associated with the content to provide access to the content in response to receipt of a false positive report associated with the at least one access blocking criterion matched.

4. The method of claim 1, further comprising:
   deactivating the block access tag associated with the content to provide access to the content in response to receipt of a request to perform one of a policy check and a reclassification.

5. The method of claim 1, further comprising:
   determining if a user with access to the content matches the access blocking criteria defined by one or more DLP policy rules;
   in response to a determination that the user matches at least one access blocking criterion defined by the one or more DLP policy rules, activating the block access tag associated with the content to restrict access to the content; and
   deactivating the block access tag associated with the content to provide access to the content in response to detecting removal of the user corresponding to the at least one access blocking criterion from access to the content.

6. The method of claim 1, further comprising:
determining if a location of the content matches the access blocking criteria defined by one or more DLP policy rules;
in response to a determination that the location matches at least one access blocking criterion defined by the one or more DLP policy rules, activating the block access tag associated with the content to restrict access to the content; and
deactivating the block access tag associated with the content to provide access to the content in response to detecting a change of the location corresponding to the at least one access blocking criterion.

7. The method of claim 1, further comprising:
ignoring previously defined permissions associated with the content while the block access tag is activated; and
reinstating the previously defined permissions associated with the content in response to deactivation of the block access tag.

8. The method of claim 1, further comprising:
providing for display, on the user experience of the application that is displaying the content, another notification to the user, wherein the other notification indicates the restricted access to the content.

9. The method of claim 1, further comprising:
in response to a determination that the information associated with the content does not match at least one of the access blocking criterion, providing for display, on the user experience of the application that is displaying the content, a further notification to the user, wherein the further notification includes a link to a DLP policy document comprising one or more DLP policy rules, a link to a location of the content and control elements associated with one or more actions.

10. A computing device to provide access blocking as part of data loss prevention (DLP) within a collaborative service environment, the computing device comprising:
a communication interface configured to facilitate communication between the computing device and a collaboration service;
a memory configured to store instructions; and
a processor coupled to the communication interface and the memory, wherein the processor is configured to:
evaluate content of a user processed by the collaborative service, wherein the content is associated with an application executed within an infrastructure provided by the collaborative service;
determine if information associated with the content matches access blocking criteria defined by one or more DLP policy rules;
in response to a determination that a portion of the information matches at least one access blocking criterion defined by the one or more DLP policy rules, automatically activate a block access tag associated with the content to restrict access to the content;
provide for display, on a user experience of the application that is displaying the content, a notification to the user, wherein the notification describes the at least one access blocking criterion and the portion of the information, and the notification includes a control element associated with an action to remove the portion of the information in order to deactivate the block access tag associated with the content;
detect a selection of the control element on the user experience by the user to remove the portion of the information that matches the at least one access blocking criterion defined by the one or more DLP policy rules from the content; and
responsive to the removal, automatically deactivate the block access tag associated with the content to provide access to the content based on a determination that the information associated with the content does not match the access blocking criteria defined by the one or more DLP policy rules.

11. The computing device of claim 10, wherein the computing device is associated with a client comprising a classification engine and a policy engine.

12. The computing device of claim 11, wherein the processor is further configured to execute one or more of the classification engine and the policy engine to evaluate the content.

13. The computing device of claim 10, wherein the content is evaluated in response to one of: an opening of the content, an editing of the content, a sharing of the content, a copying of the content, a moving of the content, a publishing of the content, a saving of the content, a printing of the content, an uploading of the content, a downloading of the content, and an expiration of a predefined time interval.

14. The computing device of claim 10, wherein the restricted access to the content includes one or more of read, edit, and share permissions.

15. The computing device of claim 10, wherein the processor is further configured to:
record one or more of the match, the restricted access to the content, the provision of access to the content, an override of the restricted access to the content, and a false positive report within a log associated with the collaborative service.

16. The computing device of claim 10, wherein the block access tag associated with the content is persisted to an index of the collaborative service.

17. A method to provide access blocking as part of data loss prevention (DLP) within a collaborative service environment, the method comprising:
evaluating content of a user processed by a collaborative service, wherein the content is associated with an application executed within an infrastructure provided by the collaborative service;
determining if information associated with the content, a user with access to the content, or a location of the content matches access blocking criteria defined by one or more DLP policy rules;
in response to a determination that one or more of a portion of the information, the user, and the location matches at least one access blocking criterion defined by the one or more DLP policy rules, automatically activating a block access tag associated with the content to restrict access to the content;
providing for display, on a user experience of the application that is displaying the content, a notification to the user, wherein the notification describes the at least one access blocking criterion and the one or more of the portion of the information, the user, and the location, and the notification includes a control element associated with an action to remove the one or more of the portion of the information, the user, and the location in order to deactivate the block access tag associated with the content;
detecting a selection of the control element on the user experience by the user to remove the one or more of the portion of the information, the user, and the location that matches the at least one access blocking criterion defined by the one or more DLP policy rules from the content; and responsive to the removal, automatically deactivating the block access tag to provide access to the content based on a determination that the information associated with the content, the user with access to the content, and the location of the content do not match the access blocking criteria defined by the one or more DLP policy rules.

18. The method of claim 17, further comprising:

deactivating the block access tag associated with the content to provide access to the content in response to receipt of:
- a business justification to override the restricted access to the content;
- a false positive report associated with the at least one access blocking criterion matched, or
- a request to perform one of a policy check and a reclassification.

19. The method of claim 17, further comprising:

in response to a determination that the information associated with the content does not match at least one of the access blocking criterion, providing for display, on the user experience of the application that is displaying the content, another notification to the user.

20. The method of claim 19, wherein the other notification includes a link to a DLP policy document that includes the one or more DLP rules, a link to a location of the content, and control elements associated with one or more actions.

\* \* \* \* \*